(12) United States Patent
Borrelli et al.

(10) Patent No.: US 6,754,429 B2
(45) Date of Patent: Jun. 22, 2004

(54) METHOD OF MAKING OPTICAL FIBER DEVICES AND DEVICES THEREOF

(75) Inventors: Nicholas F. Borrelli, Elmira, NY (US); Joseph F. Schroeder, Lindley, NY (US); Alexander Streltsov, Painted Post, NY (US); Edward F. Murphy, Hammondsport, NY (US)

(73) Assignee: Corning Incorporated, Corning, NY (US)

( * ) Notice: Subject to any disclaimer, the term of this patent is extended or adjusted under 35 U.S.C. 154(b) by 179 days.

(21) Appl. No.: 10/183,879

(22) Filed: Jun. 25, 2002

(65) Prior Publication Data

US 2003/0007772 A1 Jan. 9, 2003

Related U.S. Application Data

(60) Provisional application No. 60/303,765, filed on Jul. 6, 2001.

(51) Int. Cl.[7] .......................... G02B 6/00; C03C 15/00; C03C 17/00
(52) U.S. Cl. ...................... 385/137; 385/134; 65/30.11; 65/31
(58) Field of Search ................................. 385/134, 137

(56) References Cited

U.S. PATENT DOCUMENTS

| | | | |
|---|---|---|---|
| 5,374,291 A | 12/1994 | Yabe et al. | 65/30.11 |
| 5,824,127 A | 10/1998 | Bange et al. | 65/90 |
| 5,879,424 A | 3/1999 | Nishii et al. | 65/31 |
| 5,966,485 A | * 10/1999 | Luther et al. | 385/85 |
| 6,128,924 A | 10/2000 | Bange et al. | 65/90 |

FOREIGN PATENT DOCUMENTS

| | | |
|---|---|---|
| JP | 405139787 A | 6/1993 |
| WO | WO 01/44871 | 6/2001 |

OTHER PUBLICATIONS

Borelli et al, "Fabrication and analysis of a directional coupler written in glass by nanojoule femtosecond laser pulses", Optics Letters vol. 26, No. 1, Jan. 1, 2001, pp. 42–43.

Juodkazis et al., "Femtosecond laser–assisted three–dimensional microfabrication in silica", Optics Letters, vol. 26, No. 5, Mar. 1, 2001, pp. 277–279.

* cited by examiner

Primary Examiner—Brian Healy
Assistant Examiner—Tina M Lin
(74) Attorney, Agent, or Firm—Timothy M. Schaeberle

(57) ABSTRACT

The invention provides a method of making optical fiber devices. The method includes providing an ultrashort subpicosecond laser pulse duration pulse laser for producing a laser output with a wavelength $\lambda$, providing a laser output focussing lens having an air working distance $\geq 3$ mm and a $\leq 1$ NA numerical aperture for focussing said laser output, providing a controllable positioning translation stage for receiving an optical fiber device oxide bulk glass body, providing an optical fiber device oxide bulk glass body having a transparency at $\lambda$ of at least 90%/cm, positioning said oxide bulk glass body with said stage wherein said glass body is received by said stage, focussing said laser output through said laser output focussing lens to produce a subpicosecond laser pulse duration focus proximate the oxide bulk glass body and translating the oxide bulk glass body relative to said subpicosecond laser pulse duration focus wherein said focus traces a hole precursor track pattern through the oxide bulk glass body, acid etching the oxide bulk glass body in an agitated heated acid bath wherein the focussed traced hole precursor track pattern is etched into an optical fiber receiving hole, cleansing the acid etched oxide bulk glass body with the etched optical fiber receiving hole, and inserting an optical fiber into the optical fiber receiving hole to provide a hole contained optical fiber.

105 Claims, 33 Drawing Sheets

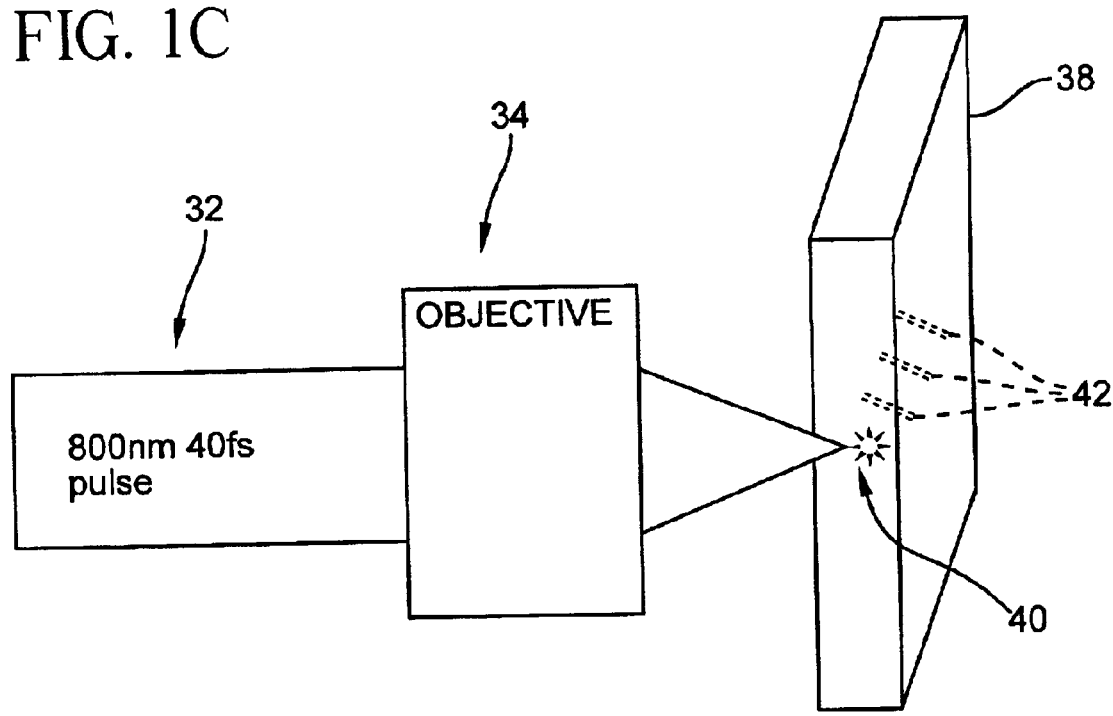
FIG. 1C
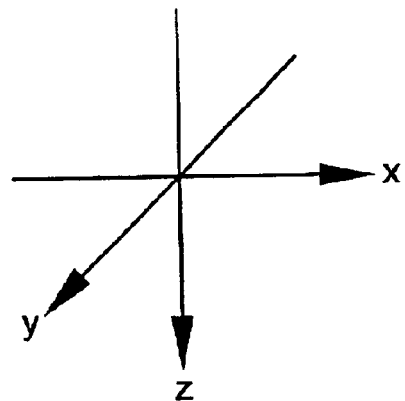

90.3X 90.3X 90.3X

METHOD OF MAKING OPTICAL FIBER DEVICES AND DEVICES THEREOF

CROSS-REFERENCE TO RELATED APPLICATIONS

This application claims the benefit of, and incorporates by reference, U.S. Provisional Application, Serial No. 60/303,765, filed Jul. 6, 2001 entitled METHOD OF MAKING OPTICAL FIBER DEVICES AND DEVICES THEREOF, by N. F. Borrelli, J. F. Schroeder, A. Streltsov and E. F. Murphy.

BACKGROUND OF THE INVENTION

The present invention relates generally to optical fiber devices, and particularly to a method of making optical fiber devices.

In the optical communications field of optical fibers and photonic devices, it is desirable to have optical fibers precisely held and positioned in a photonic material device. Optical communications devices often require the precise holding of optical fibers in a material, for example as an optical fiber ferrule.

SUMMARY OF THE INVENTION

One aspect of the invention relates to making optical fiber devices for holding optical fibers.

The invention includes methods of making optical fiber devices.

The invention includes providing an ultrashort pulse laser for producing a laser output with a wavelength λ with the laser output having a subpicosecond laser pulse duration. The method includes providing a laser output focusing lens for focusing laser output. The method includes providing a computer controllable positioning translation stage for receiving an oxide bulk glass body. The method includes providing oxide bulk glass body and positioning the glass body with the stage with the glass body received by the stage. The method includes focusing the laser output through the laser output focusing lens to produce a subpicosecond laser pulse duration focus proximate the oxide bulk glass body. The method includes translating the oxide bulk glass body relative to the subpicosecond laser pulse duration focus wherein the focus traces a hole precursor track pattern through oxide bulk glass body. The method includes acid etching the oxide bulk glass body in an agitated heated acid bath wherein the focused traced hole precursor track pattern is etched into an optical fiber receiving hole. The method includes cleansing the acid etched oxide bulk glass body having the etched optical fiber receiving hole. The method includes inserting an optical fiber into the optical fiber receiving hole to provide a hole contained optical fiber.

The invention includes a method of making a bulk oxide glass optical fiber holder.

The invention includes a method of making a plurality of precision holes through a thick bulk oxide glass body.

The invention includes a bulk oxide glass precision hole precursor preform body comprising a bulk oxide glass body containing at least one laser traced outline shell hole precursor track pattern traversing through the bulk oxide glass body with a swelled middle.

Additional features and advantages of various embodiments of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIGS. 1A–1C show embodiments of the invention.

DETAILED DESCRIPTION OF THE PREFERRED EMBODIMENTS

Reference will now be made in detail to the present preferred embodiments of the invention. Examples of which are illustrated in the accompanying FIGs.

Figure 1A:
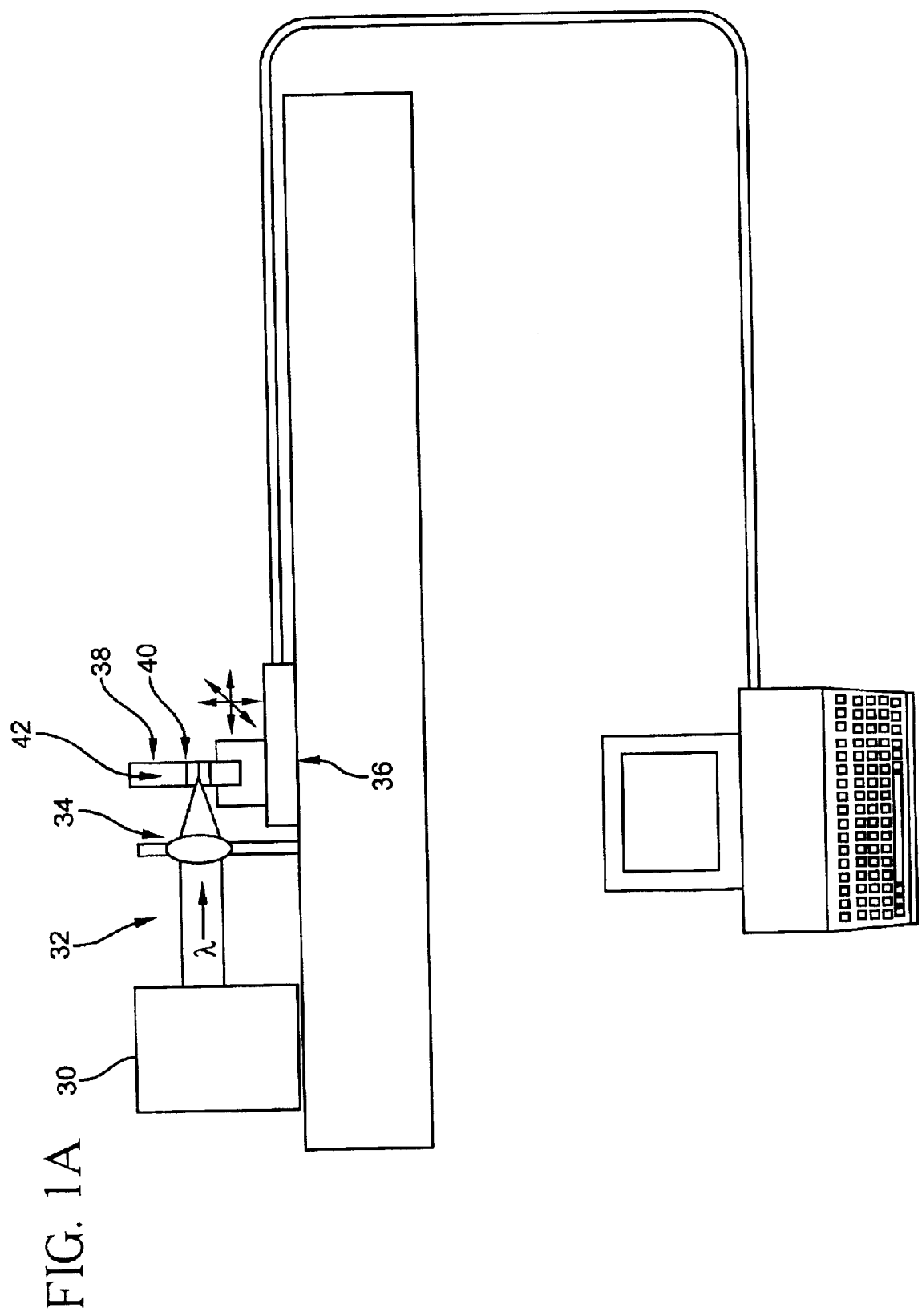
Figure 1B:
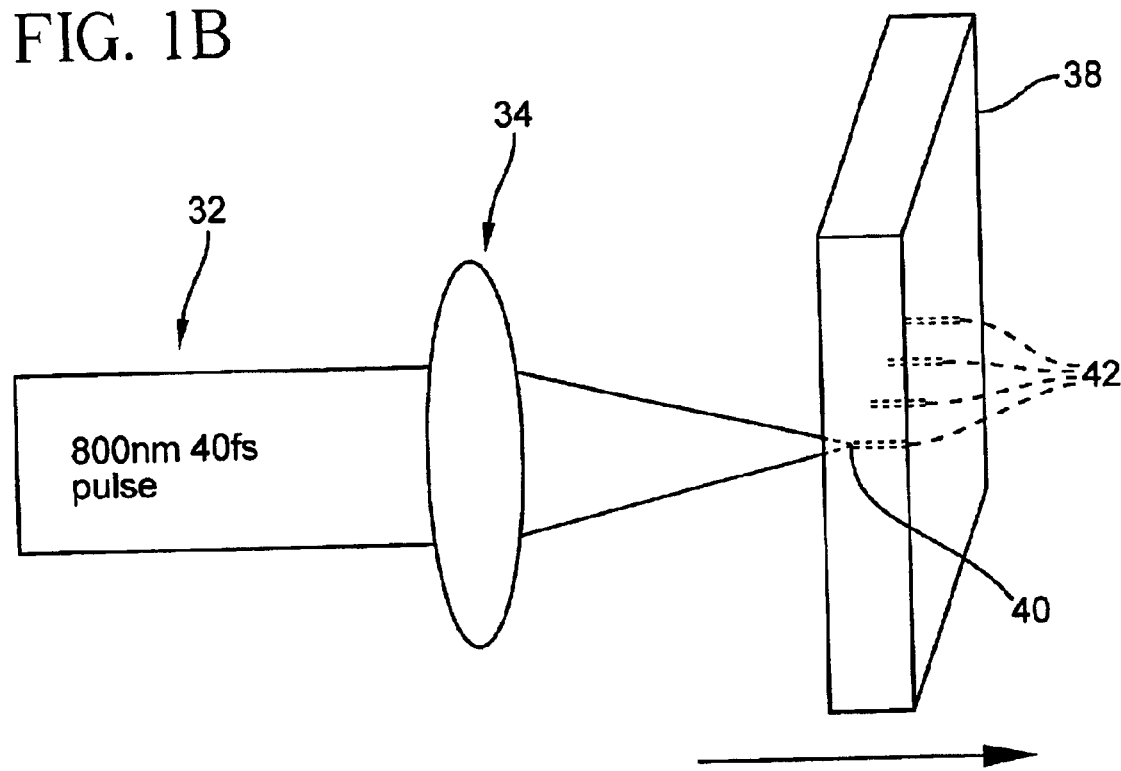
Figure 2:
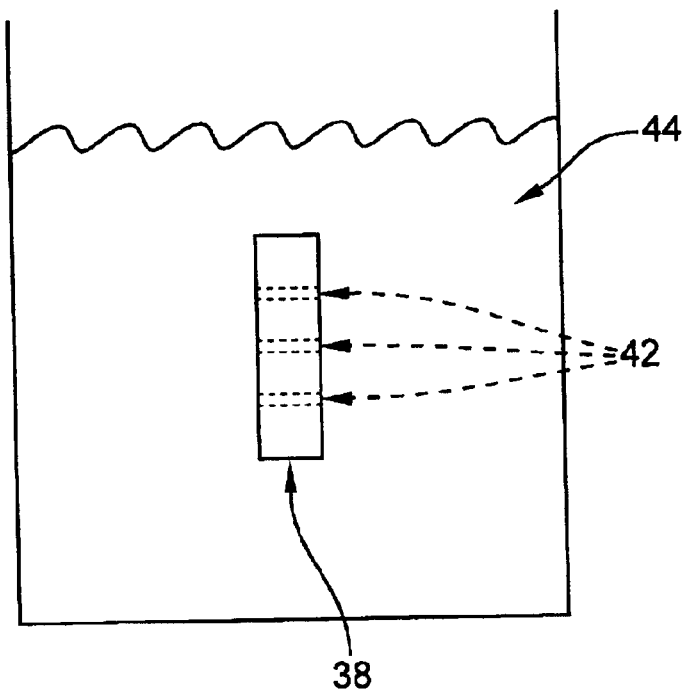
FIG. 2 shows an embodiment of the invention.
Figure 3:
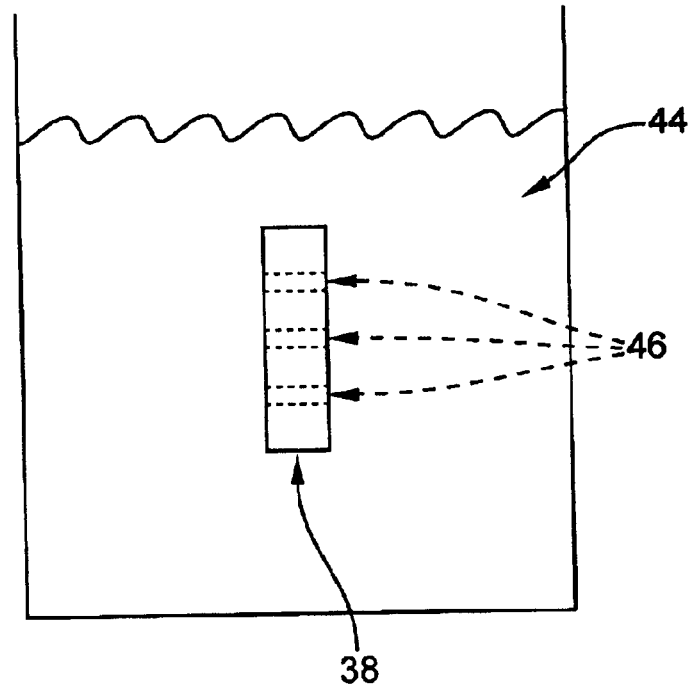
FIG. 3 shows an embodiment of the invention.
Figure 4:
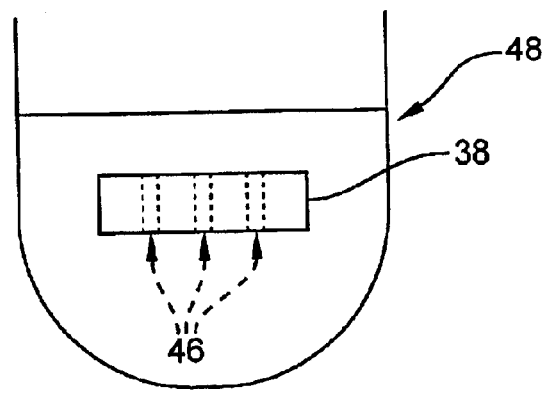
FIG. 4 shows an embodiment of the invention.
Figure 4:
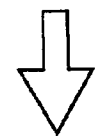
Figure 4:
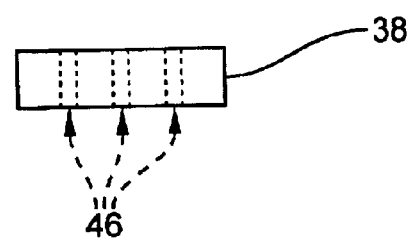
Figure 5:
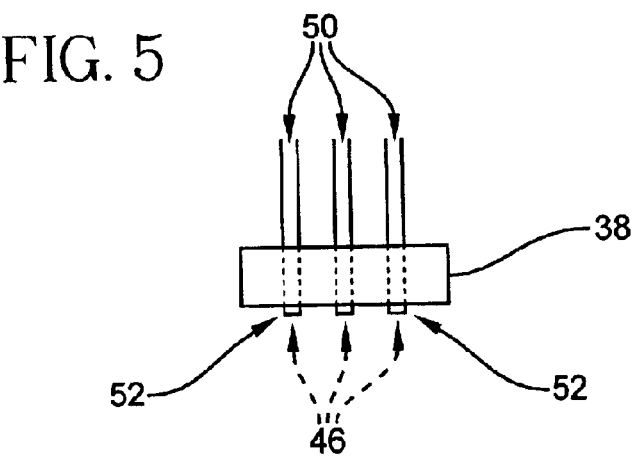
FIGS. 5–5A show embodiments of the invention.
Figure 5A:
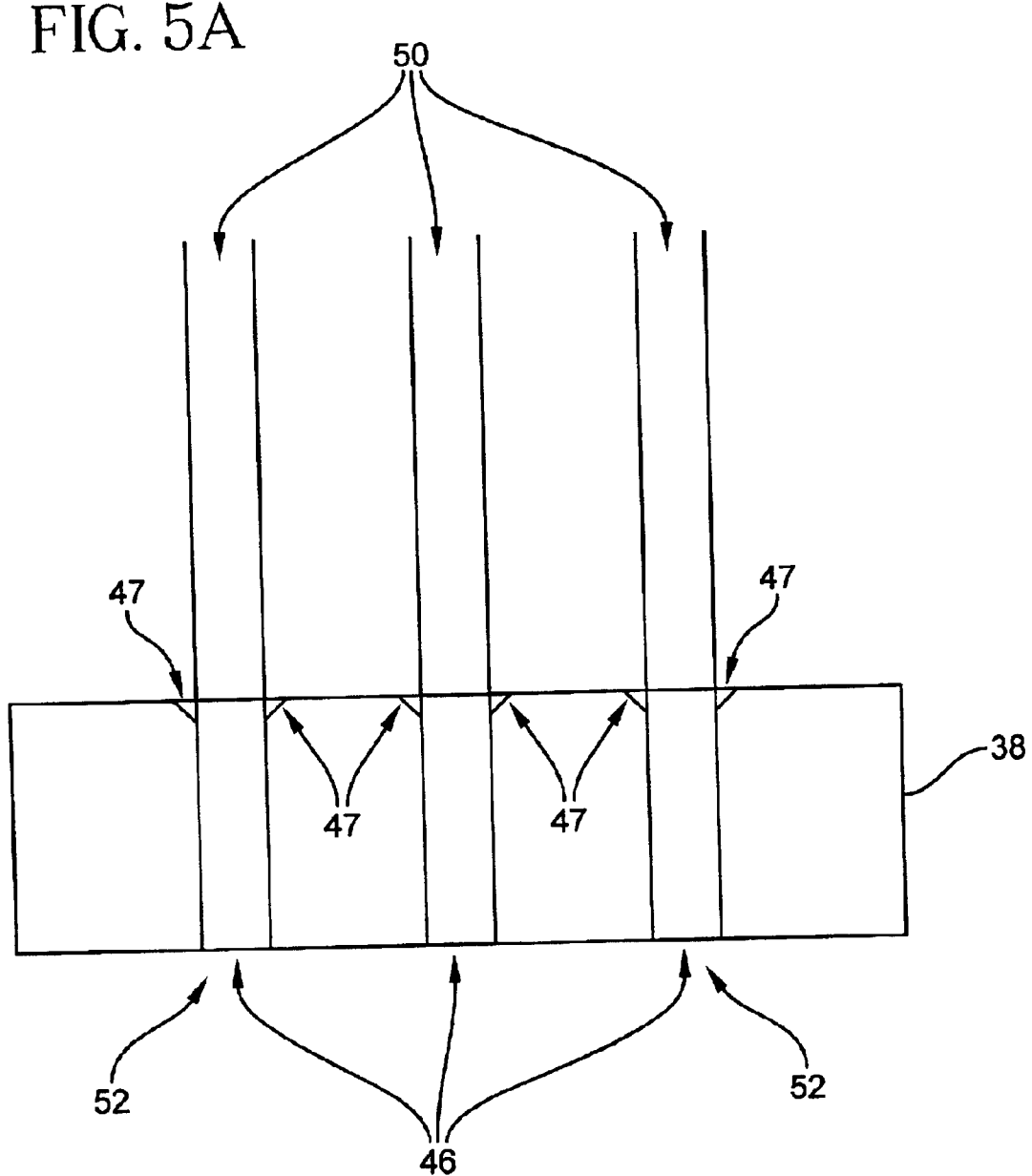

The invention relates to making optical fiber devices for holding optical fibers. The invention relates to making optical fiber devices for holding optical fibers including optical fiber ferrules. The invention includes a method of making an optical fiber device. As shown in FIGS. 1A–C, the method includes providing an ultrashort pulse laser 30 for producing a laser output 32 with a wavelength λ with the laser output having a subpicosecond laser pulse duration. The method includes providing a laser output focusing lens 34 for focusing laser output 32 with the lens having an air working distance $\geq 3$ mm and a NA $\leq 1$ numerical aperture, more preferably a NA $\leq 0.5$ numerical aperture. Preferably the laser output focusing objective lens 34 has a working distance between 3 mm and 30 mm, and a numerical aperature NA between about 0.26 and 0.5, more preferred 0.28 and 0.5. The method includes providing a computer controllable positioning translation stage 36 for receiving an oxide bulk glass body 38. The method includes providing oxide bulk glass body 38 with the glass body 38 having a transparency at λ of at least 90%/cm and positioning the glass body 38 in stage 36 with glass body 38 received by stage 36. The method includes focusing laser output 32 through laser output focusing lens 34 to produce a subpicosecond laser pulse duration focus 40 proximate oxide bulk glass body 38. The method includes translating the oxide bulk glass body 38 relative to subpicosecond laser pulse duration focus 40 wherein focus 40 traces a hole precursor track pattern 42 through oxide bulk glass body 38. As shown in FIGS. 2–3 the method includes acid etching the oxide bulk glass body 38 in an ultrasonic agitated heated acid bath 44 wherein the focused traced hole precursor track pattern 42 is etched into an optical fiber receiving hole 46. Preferably the acid bath is heated to at least 50 degrees Celsius. As shown in FIG. 4, the method includes cleansing acid etched oxide bulk glass body 38 having etched optical fiber receiving hole 46 such as rinsing in a rinsing water bath 48 and then drying. As shown in FIGS. 5 and 5A the method includes inserting an optical fiber 50 into optical fiber receiving hole 46 to provide a hole contained optical fiber 52.

In a preferred embodiment, providing ultrashort pulse laser 30 includes providing a <100 fs pulse laser for producing a laser output 32 having a <100 fs laser pulse duration. More preferably laser 30 is a <50 fs pulse laser pulse duration output 32, and most preferably laser 30 is a $\leq$40 fs pulse laser which produces a $\leq$40 fs laser pulse duration output 32. Preferably providing ultrashort pulse laser 30 includes providing a $\geq$5 μJ pulse energy laser which produces a laser output 32 having a $\geq$5 μJ pulse energy, more preferably a $\geq$10 μJ pulse energy laser which produces a laser output 32 having a $\geq$10 μJ pulse energy. Most preferably laser 30 is a $\geq$15 μJ pulse energy laser which produces a laser output 32 having a $\geq$15 μJ pulse energy, and particularly a laser output pulse energy of about 16 μJ (16±1 μJ). Preferably providing ultrashort pulse laser 30 includes providing a λ <1000 nm laser 30 which produces an ultrashort pulse laser output 32 with a λ <1000 nm, more preferably with a λ in the range of 800±100 run, and most preferably with λ centered about 800 nm.

Acid etching oxide bulk glass body 38 with track patterns 42 preferably includes ultrasonically agitating the acid bath 44. Preferably said etching includes heating the acid-bath 44 to provide a heated acid bath 44 having a predetermined heat elevated acid bath temperature, with preferably heating said acid bath to at least 50° C., and most preferably in the 55±5° C. temperature range. Acid etching oxide bulk glass body 38 preferably includes providing a hydrofluoric (HF) acid bath 44, preferably with HF acid bath 44 being an aqueous solution of >5% HF vol. %, more preferably $\geq$10% HF vol. %, and most preferably about 15% (15%±5%), with the glass body 38 acid etched for about 30 minutes (30±15 minutes), and most preferably with the glass body 38 acid etched for no greater than about one hour.

Providing oxide bulk glass body 38 preferably includes providing an oxide bulk glass body 38 with a λ transparency $\geq$95%/cm, preferably with an absorption at λ which is <5·10$^{-2}$ cm$^{-1}$.

In an embodiment of the invention, providing oxide bulk glass body 38 comprises providing a $TiO_2$ containing silica glass body. In a preferred embodiment, the $TiO_2$ silicon dioxide silica glass body contains from 5 to 10 wt. % $TiO_2$, most preferably with the $TiO_2$ silica glass having an OH content >100 ppm OH wt., more preferably >500 ppm OH wt., preferably with the silica glass being a direct deposit glass which consists essentially of $SiO_2$ and $TiO_2$. In a particularly preferred embodiment the $TiO_2$ silicon dioxide fused silica glass body contains from 6 to 8 wt. %, more preferably form 6.5 to 7.5 wt. %, and most preferably about 7 wt. % $TiO_2$. Preferably the 6 to 8 wt. % $TiO_2$ silicon dioxide fused silica glass body has a CTE in the range of −30 ppb/° C. to 30 ppb/° C. in the temperature range of 5° C. to 35° C. In an alternative embodiment the $TiO_2$ containing silica glass is an unceramed glass-ceramic precursor glass. Providing oxide bulk glass body 38 preferably includes providing an oxide bulk glass body 38 being a silica glass with at least 100 ppm OH wt., more preferably with at least 500 ppm wt. OH, and most preferably at least 800 ppm wt. OH. In a preferred embodiment the OH containing silica glass is a direct deposit high purity fused silica glass. In an alternative the silica glass body is a batch melted glass with <99% $SiO_2$. In an embodiment the silica glass body is a batch melted borosilicate glass, preferably with at least 1% boric oxide, and more preferably at least 3% boric oxide. In an embodiment the silica glass body is a batch melted soda-lime glass, preferably with at least 1% $Na_2O$ and 1% CaO, and more preferably at least 3% $Na_2O$ and 3% CaO. In an embodiment the silica glass body is a batch melted fusion drawn flat glass member, preferably a $B_2O_3$ alumina silica glass, such as a flat panel display glass for example about 50(±5) wt. % $SiO_2$, 15(±5) wt. % Alumina, 7.5(±2) wt. % $B_2O_3$, and 14(±5) wt. % Alkaline earth. In an embodiment providing oxide bulk glass body 38 preferably includes providing an unceramed glass-ceramic precursor glass. Preferably the unceramed glass-ceramic precursor glass with hole precursor track patterns is cerammed before the acid etching of the glass body to develop crystals. With the embodiment of ceramming heat treatment development of crystals before the acid etching of the glass body, the oxide bulk glass body 38 preferably is a photosensitive nucleated glass, most preferably a photosensitive nucleated glass which forms lithium metasilicate microcrystalline phases, preferably a lithium aluminosilicate glass such as a fotoform lithium aluminosilicate with a composition of about 79(±1) wt. % $SiO_2$, 9.4(±1) wt. % $Li_2O$, 1.6(±1) wt. % $Na_2O$, 4(±1) wt. % $K_2O$, 4(±1) wt. % $Al_2O_3$, 1(±0.5) wt. % ZnO, 0.4(±0.2) wt. % $Sb_2O_3$, 0.015(±0.005) wt. % $CeO_2$, 0.003 (±0.003) wt. % $SnO_2$, 0.001(±0.0005) wt. % Au,0.1(±0.05) wt. % Ag. In an alternative embodiment the unceramed glass-ceramic precursor glass is cerammed after the acid etching of the glass body. In a preferred embodiment the unceramed glass-ceramic precursor glass body 38 is an aluminosilicate glass green body. In an embodiment the unceramed glass-ceramic precursor glass is a lithium aluminosilicate glass body. In an embodiment the unceramed glass-ceramic precursor glass contains $TiO_2$. In an embodiment the unceramed glass-ceramic precursor glass contains $TiO_2$ and $ZrO_2$. In a preferred embodiment the glass-ceramic precursor glass body is a lithium aluminosilicate glass body which is cerammable into a negative thermal expansion substrate, preferably with a CTE in the range from $-20 \times 10^{-7}/°$ C. to $-100 \times 10^{-7}/°$ C. in the temperature range of −40° C. to 85° C., more preferably with a $Li_2O:Al_2O_3:SiO_2$ molar ratioe ranging from 1:1:2 to 1:1:3, and most preferably comprised of 8–12 wt. % $Li_2O$, 30–45 wt. % $Al_2O_3$, 40–60 wt. % $SiO_2$, 3–6 wt. % $TiO_2$, 0–3 wt. % $B_2O_3$, 0–4 wt. % $P_2O_5$. In a preferred embodiment the glass-ceramic precursor glass body is a lithium aluminosilicate glass body which is cerammable into a glass-ceramic with a low average CTE (0–1000° C.) less than about $20 \times 10^{-7}/°$ C, preferably comprised of 3–8 wt. % $Li_2O$, 18–33 wt. % $Al_2O_3$, 55–75 wt. % $SiO_2$, and 3–5 wt. % $TiO_2+ZrO_2$. In a preferred embodiment the glass-ceramic precursor glass body is a lithium aluminosilicate glass body which is cerammable into a glass-ceramic with a mean coefficient of linear thermal expansion of 0±0.10×10$^{-6}$/K (0–50° C.), more preferably mean coefficient of linear thermal expansion of 0±0.05×10$^{-6}$/K (0–50° C.), and most preferably mean coefficient of linear thermal expansion of 0±0.02×10$^{-6}$/K (0–50° C.). Preferably the glass-ceramic precursor lithium aluminosilicate glass body which is cerammable into a glass-ceramic with a mean coefficient of linear thermal expansion of 0±0.10×10$^{-6}$/K (0–50° C.) has a weight percent composition of about 55.5(±1) wt. % $SiO_2$, 25.3(±1) wt. % $Al_2O_3$, 3.7(±1) wt. % $Li_2O$, 1(±1) wt. % MgO, 1.4(±1) wt. % ZnO, 7.9(±1) wt. % $P_2O_5$, 0.5(±0.5) wt. % $Na_2O$, 0.03(±0.03) wt. % $Fe_2O_3$, 2.3(±1) wt. % $TiO_2$, 1.9(±1) wt. % $ZrO_2$, 0.5(±1.5) wt. % $As_2O_3$.

Figure 6A:
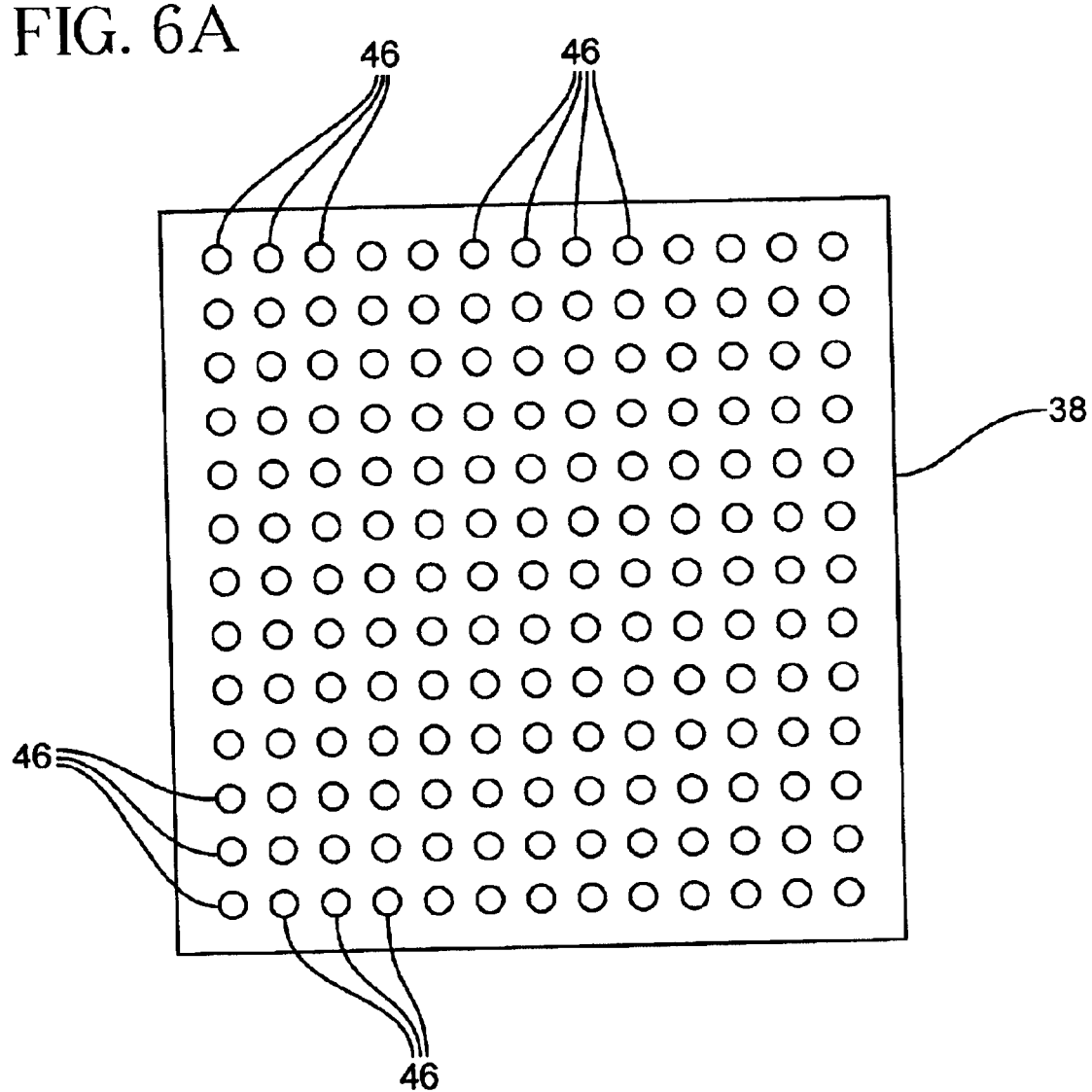
FIGS. 6A–6C show embodiments of the invention.
Figure 6B:
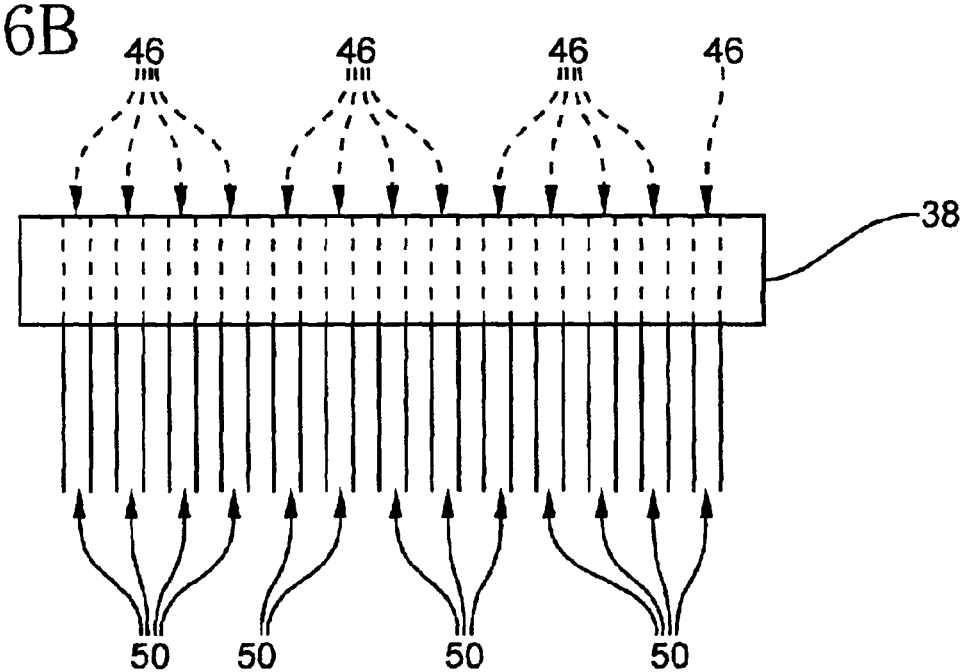
Figure 6C:
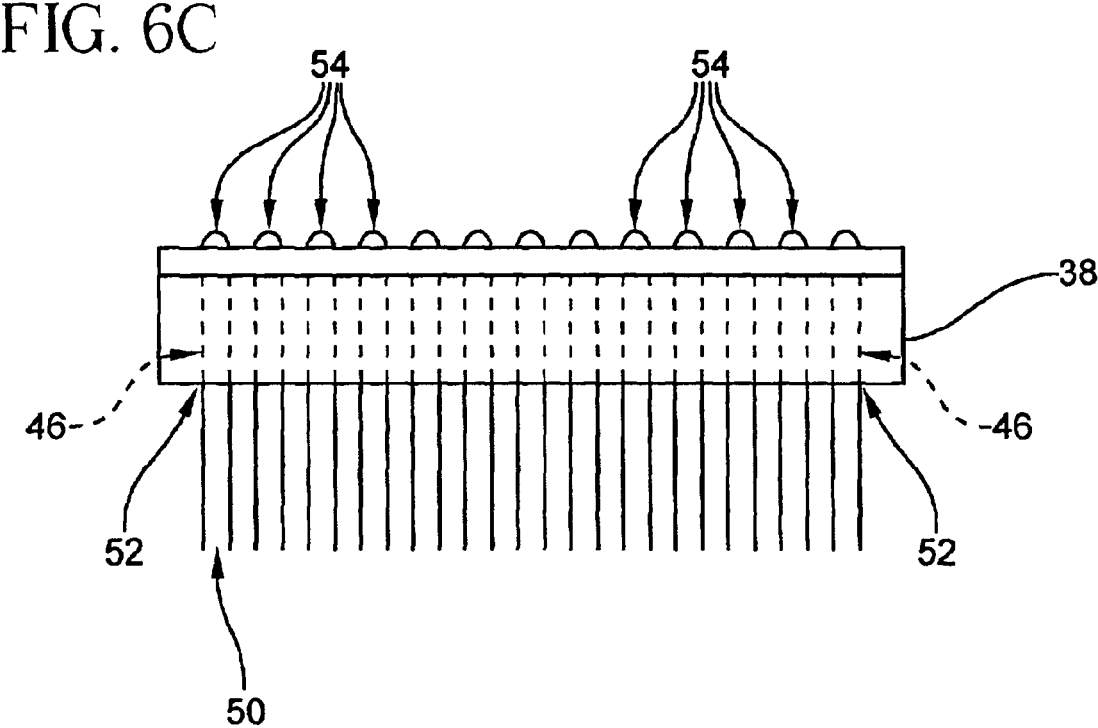
Figure 7A:
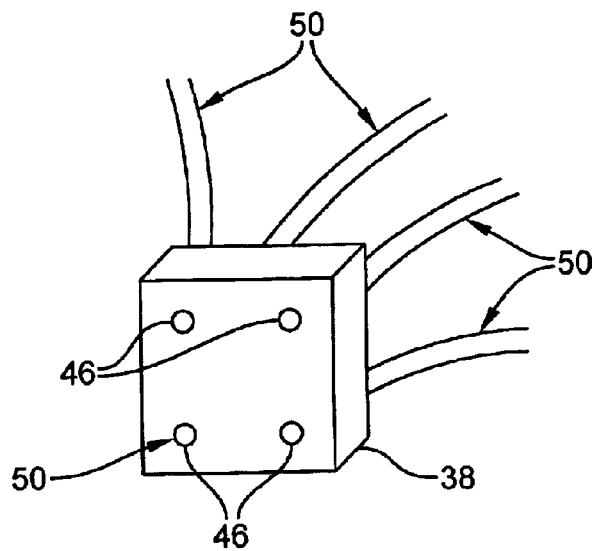
FIGS. 7A–7D show embodiments of the invention.
Figure 7B:
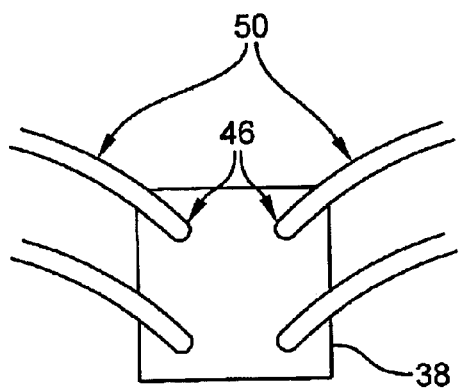
Figure 7C:
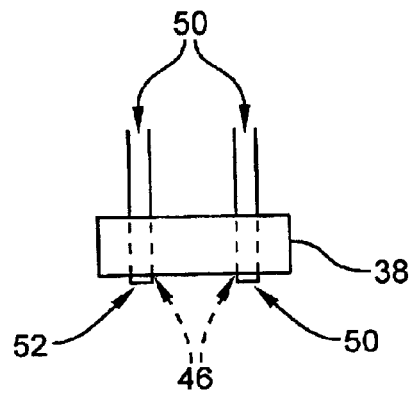
Figure 7D:
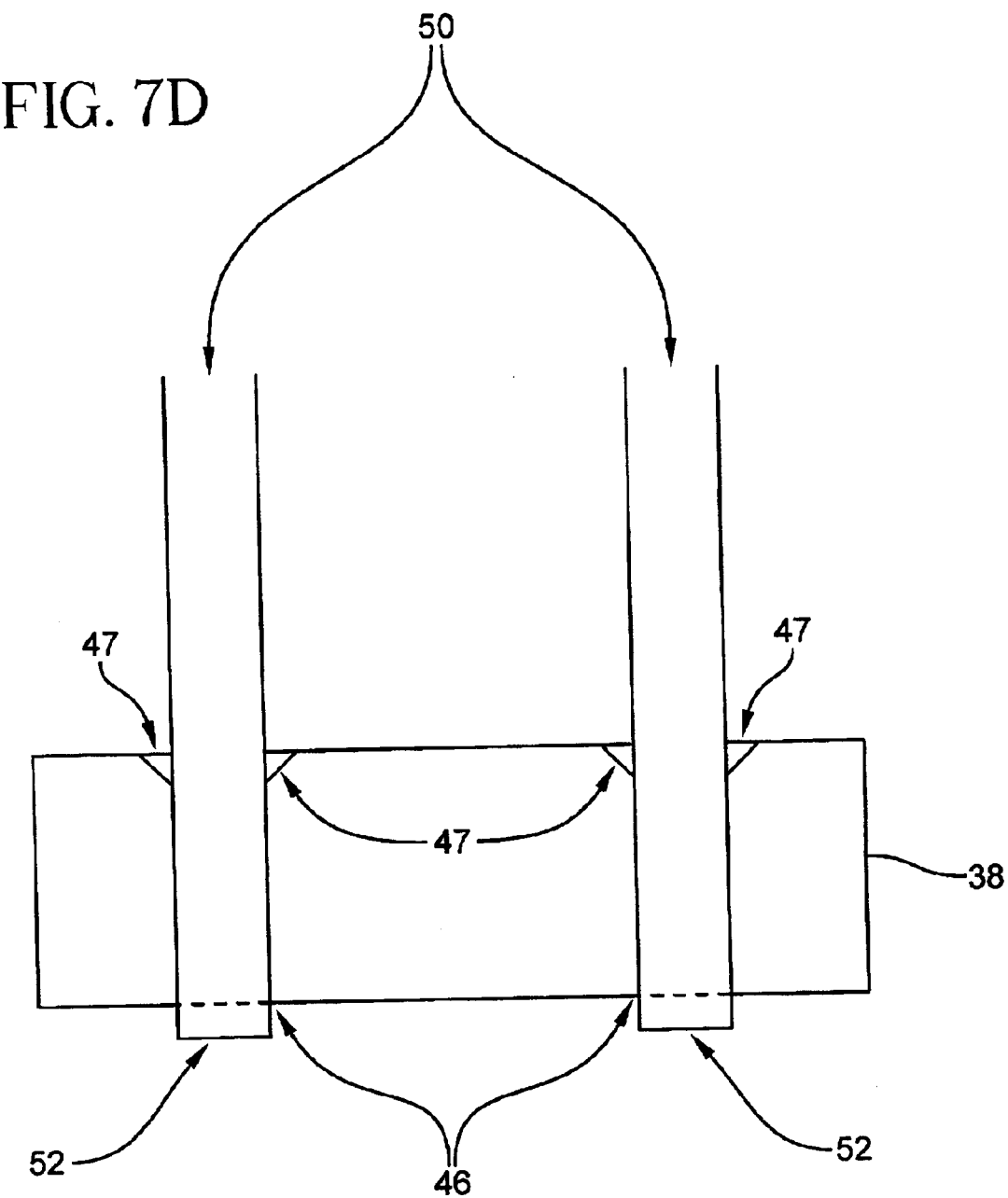
Figure 8A:
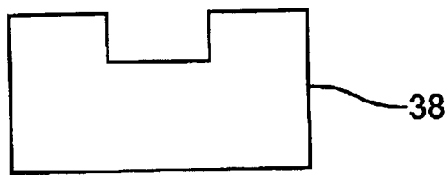
FIGS. 8A–8E show embodiments of the invention.
Figure 8B:
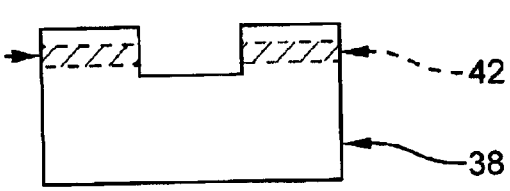
Figure 8C:
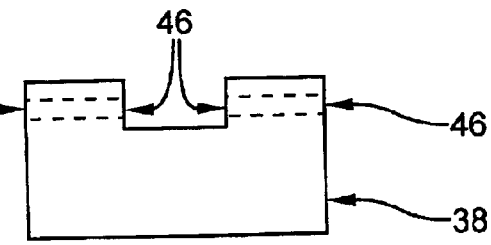
Figure 8D:
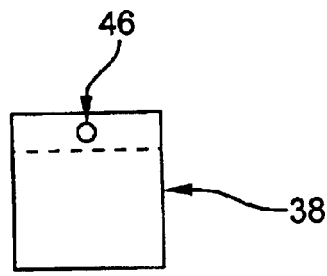
Figure 8E:
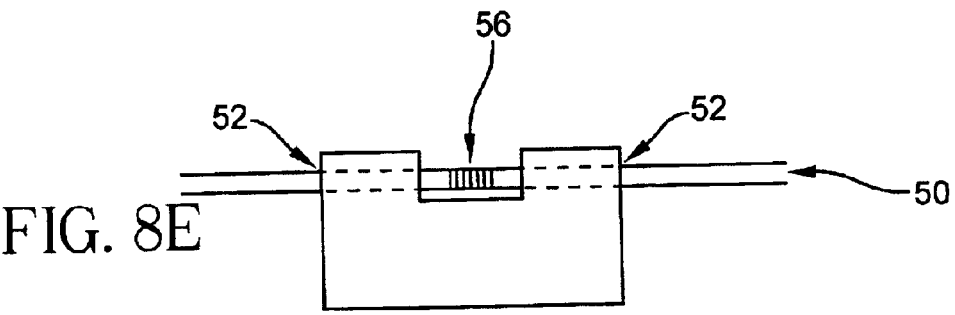
Figure 9A:
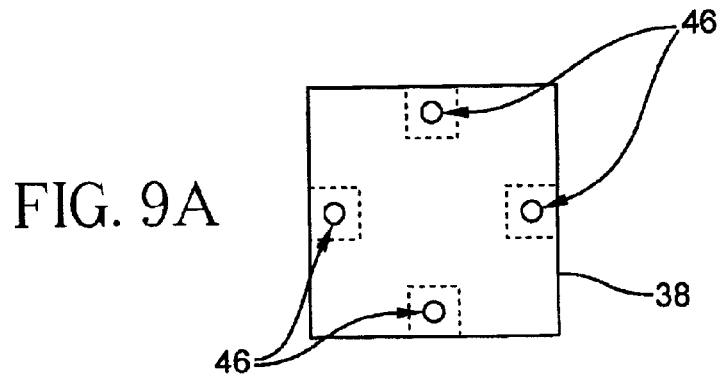
FIGS. 9A–9F show embodiments of the invention.
Figure 9B:
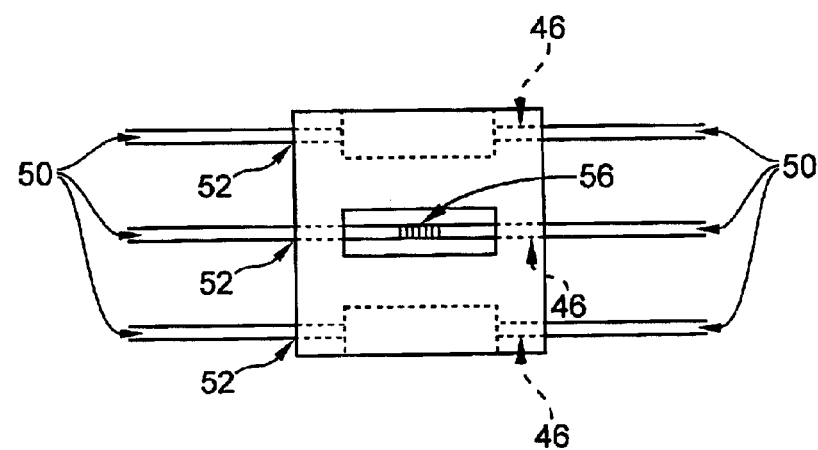
Figure 9C:
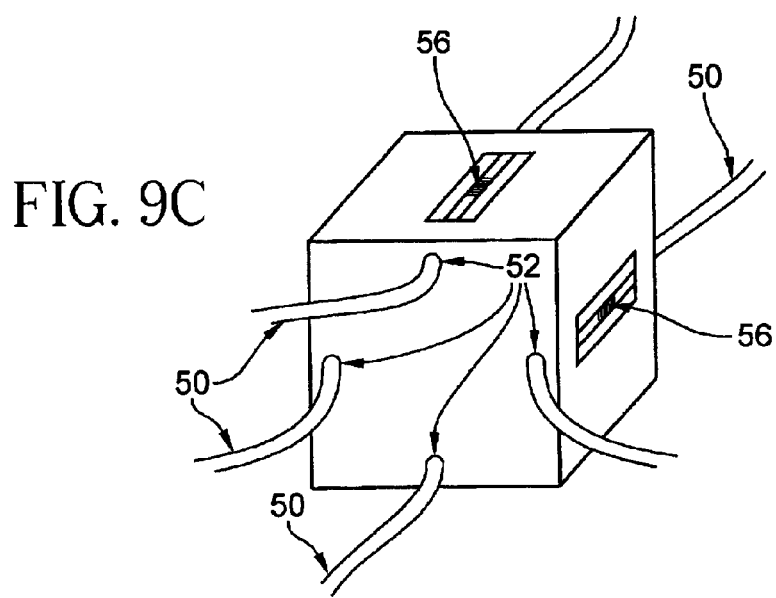
Figure 9D:
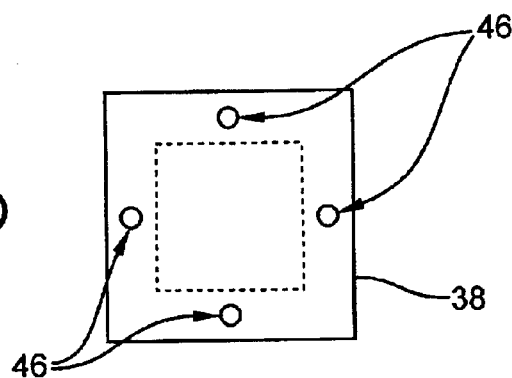
Figure 9E:
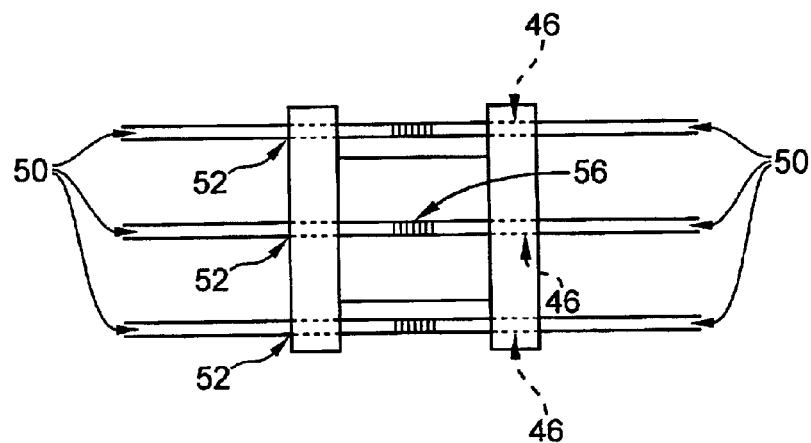
Figure 9F:
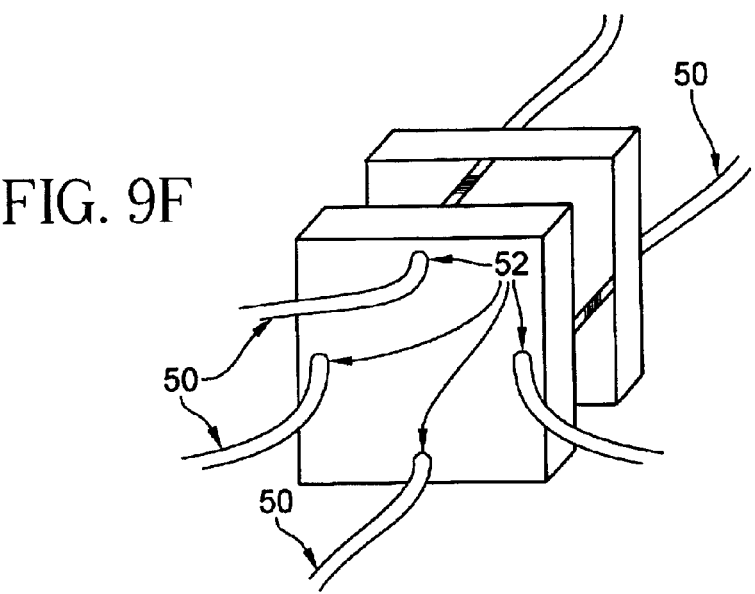

The invention includes methods of making optical fiber devices and the optical fiber devices made therefrom. As illustrated in FIGS. 6A–C, the invention preferably includes focus tracing a plurality of hole precursor track patterns in predetermined locations in oxide bulk glass body 38 to provide an array of optical fiber receiving holes 46. As shown in FIG. 6C, such a large array of holes 46 are utilized to form an optical fiber lens array with precision formed holes 46 aligned with lens 54 of the optical fiber lens array such that the holes 46 provide for the alignment of the cores of optical fibers 50 with the optical axis of the lens 54. As shown in FIGS. 7A–D the invention provides an efficient means for precisely aligning a plurality of optical fibers 50 with the fibers contained in the optical fiber receiving holes 46, with such an optical fiber holder device utilizable in an optical fiber photonic device. As shown in FIGS. 8A–E, the invention can be utilized to make an optical fiber device where the optical fiber is held at two separated places with such a device, oxide bulk glass body 38 is preferably an uncerammed glass-ceramic precursor glass and the glass body 38 is cerammed into a negative thermal expansion glass-ceramic. With embodiments such as shown in FIGS. 8–9, the oxide bulk glass body is preferably cerammed into a negative thermal expansion glass-ceramic substrate body such that optical fibers 50 containing fiber Bragg gratings 56 are secured within holes 46 with the fibers under tension. With such embodiments the gratings 56 of the hole contained fibers 52 are athermalized to temperature changes by the negative thermal expansion of the glass-ceramic adjusting the tension of the fiber.

The invention includes a method of making a bulk oxide glass optical fiber holder. The method includes providing an ultrashort pulse laser 30 for producing a laser output 32 with a wavelength λ and a subpicosecond laser pulse duration. The method includes providing a laser output focusing lens 34 for focusing laser output 32. Laser output lens 34 has an air working distance ≧3 mm and ≦1 NA numerical aperture, more preferably NA ≦0.5, and most preferably 0.28<NA<0.5. The method includes providing oxide bulk glass receiving stage 36 for receiving an oxide bulk glass body 38. The method includes providing an oxide bulk glass body 38 having a transparency at λ of at least 90%/cm and positioning glass body 38 with the stage. The method includes focusing laser output 32 through lens 34 to produce a subpicosecond laser pulse duration focus proximate oxide bulk glass body 38 and tracing a hole precursor track pattern 42 through oxide bulk glass body 38 with the subpicosecond laser pulse duration focus. The method includes acid etching oxide bulk glass body 38 in an ultrasonic HF acid bath 44 wherein laser focus traced hole precursor track pattern 42 is etched into an optical fiber receiving hole 46, and rinsing and drying the acid etched oxide bulk glass body to provide an optical fiber holder. In a preferred embodiment, providing ultrashort pulse laser 30 includes providing a <100 fs pulse laser for producing a laser output 32 having a <100 fs laser pulse duration. More preferably laser 30 is a <50 fs pulse laser pulse duration output 32, and most preferably laser 30 is a ≦40 fs pulse laser which produces a ≦40 fs laser pulse duration output 32. Preferably providing ultrashort pulse laser 30 includes providing a ≧5 μJ pulse energy laser which produces a laser output 32 having a ≧5 μJ pulse energy, more preferably a ≧10 μJ pulse energy laser which produces a laser output 32 having a ≧10 μJ pulse energy. Most preferably laser 30 is a ≧15 μJ pulse energy laser which produces a laser output 32 having a ≧15 μJ pulse energy, and particularly a laser output pulse energy of about 16 μJ (16±1 μJ). Preferably providing ultrashort pulse laser 30 includes providing a λ<1000 nm laser 30 which produces an ultrashort pulse laser output 32 with a λ<1000 nm, more preferably with a λ in the range of 800±100 nm, and most preferably with λ centered about 800 nm. Acid etching oxide bulk glass body 38 with track patterns 42 preferably includes ultrasonically agitating the acid bath 44. Preferably said etching includes heating the acid-bath 44 to provide a heated acid bath 44 having a predetermined heat elevated acid bath temperature, with preferably heating said acid bath to at least 50° C., and most preferably in the 55±5° C. temperature range. Acid etching oxide bulk glass body 38 preferably includes providing a hydrofluoric (HF) acid bath 44, preferably with HF acid bath 44 being an aqueous solution of >5% HF vol. %, more preferably ≧10% HF vol. %, and most preferably about 15% (15%±5%), with the glass body 38 acid etched for about 30 minutes (30±15 minutes), and most preferably with the glass body 38 acid etched for no greater than about one hour. Providing oxide bulk glass body 38 preferably includes providing an oxide bulk glass body 38 with a λ transparency ≧95%/cm, preferably with an absorption at λ which is <5·10$^{-2}$ cm$^{-1}$. In an embodiment of the invention, providing oxide bulk glass body 38 comprises providing a $TiO_2$ containing silica glass body. In a preferred embodiment, the $TiO_2$ silicon dioxide silica glass body contains from 5 to 10 wt. % $TiO_2$, most preferably with the $TiO_2$ silica glass having an OH content >100 ppm OH wt., more preferably >500 ppm OH wt, preferably with the silica glass being a direct deposit glass which consists essentially of $SiO_2$ and $TiO_2$. In an alternative embodiment the $TiO_2$ containing silica glass is an uncerammed glass-ceramic precursor glass. Providing oxide bulk glass body 38 preferably includes providing an oxide bulk glass body 38 preferably includes providing an oxide bulk glass body 38 being a silica glass with at least 100 ppm OH wt., more preferably with at least 500 ppm wt. OH, and most preferably at least 800 ppm wt. OH. In a preferred embodiment the OH containing silica glass is a direct deposit high purity fused silica glass. In an alternative the silica glass body is a batch melted glass with <99% $SiO_2$. Providing oxide bulk glass body 38 preferably includes providing an uncerammed glass-ceramic precursor glass, preferably with the uncerammed glass-ceramic precursor glass cerammed after the acid etching of the glass body. In a preferred embodiment the uncerammed glass-ceramic precursor glass body 38 is an aluminosilicate glass green body. In an embodiment the uncerammed glass-ceramic precursor glass is a lithium aluminosilicate glass body. Preferably glass body 38 is comprised of a glass as described herein and in accordance with the inventive methods.

The invention includes a method of making a plurality of precision holes through a thick bulk oxide glass body. The method includes providing ultrashort pulse laser 30 for producing laser output 32 with a wavelength λ and a subpicosecond laser pulse duration. The method includes providing laser output focusing lens 34 for focusing laser output 32 with lens 34 having an air working distance $\geq 3$ mm and a $\leq 0.5$ NA numerical aperture. The method includes providing an oxide bulk glass receiving stage 36 for receiving an oxide bulk glass body. The method includes providing an oxide bulk glass body 38 with a bulk thickness of at least 0.25 mm and a transparency at $\lambda$ of at least 90%/cm. Preferably the oxide bulk glass body has a bulk thickness of at least 0.5 mm, more preferably 1 mm, and most preferably at least 2 mm. The method includes positioning the oxide bulk glass body 38 with the stage wherein the glass body 38 is received by stage 36. The method includes focusing the laser output 32 through laser output focusing lens 34 to produce a subpicosecond laser pulse duration focus 40 proximate glass body 38. The method includes tracing a long hole precursor track pattern 42 which is at least 0.25 mm long through the at least 0.25 mm bulk thickness of glass body 38. The subpicosecond laser pulse duration focus 40 is traced at least 0.25 mm through the thickness of glass body 38, with the trace length hole precursor equaling the thickness length. The method includes acid etching oxide bulk glass body 38 in an ultrasonic HF acid bath wherein the laser focus traced hole precursor track pattern is etched into a precise hole 46 through the at least 0.25 mm glass bulk thickness. The method includes rinsing and drying the acid etched oxide bulk glass body 38 to provide at least one precise hole through the at least 0.25 mm glass bulk thickness. In a preferred embodiment, providing ultrashort pulse laser 30 includes providing a <100 fs pulse laser for producing a laser output 32 having a <100 fs laser pulse duration. More preferably laser 30 is a <50 fs pulse laser pulse duration output 32, and most preferably laser 30 is a $\leq 40$ fs pulse laser which produces a $\leq 40$ fs laser pulse duration output 32. Preferably providing ultrashort pulse laser 30 includes providing a $\geq 5$ $\mu J$ pulse energy laser which produces a laser output 32 having a $\geq 5$ $\mu J$ pulse energy, more preferably a $\geq 10$ $\mu J$ pulse energy laser which produces a laser output 32 having a $\geq 10$ $\mu J$ pulse energy. Most preferably laser 30 is a $\geq 15$ $\mu J$ pulse energy laser which produces a laser output 32 having a $\geq 15$ $\mu J$ pulse energy, and particularly a laser output pulse energy of about 16 $\mu J$ (16±1 $\mu J$). Preferably providing ultrashort pulse laser 30 includes providing a $\lambda$<1000 nm laser 30 which produces an ultrashort pulse laser output 32 with a $\lambda$<1000 nm, more preferably with a $\lambda$ in the range of 800±100 nm, and most preferably with $\lambda$ centered about 800 nm. Acid etching oxide bulk glass body 38 with track patterns 42 preferably includes ultrasonically agitating the acid bath 44. Preferably said etching includes heating the acid-bath 44 to provide a heated acid bath 44 having a predetermined heat elevated acid bath temperature, with preferably heating said acid bath to at least 50° C., and most preferably in the 55±5° C. temperature range. Acid etching oxide bulk glass body 38 preferably includes providing a hydrofluoric (HF) acid bath 44, preferably with HF acid bath 44 being an aqueous solution of >5% HF vol. %, more preferably $\geq 10\%$ HF vol. %, and most preferably about 15% (15%±5%), with the glass body 38 acid etched for about 30 minutes (30±15 minutes), and most preferably with the glass body 38 acid etched for no greater than about one hour. Providing oxide bulk glass body 38 preferably includes providing an oxide bulk glass body 38 with a $\lambda$ transparency $\geq 95\%$/cm, preferably with an absorption at $\lambda$ which is <5·10$^{-2}$ cm$^{-1}$. In an embodiment of the invention, providing oxide bulk glass body 38 comprises providing a $TiO_2$ containing silica glass body. In a preferred embodiment, the $TiO_2$ silicon dioxide silica glass body contains from 5 to 10 wt. % $TiO_2$, most preferably with the $TiO_2$ silica glass having an OH content >100 ppm OH wt., more preferably >500 ppm OH wt, preferably with the silica glass being a direct deposit glass which consists essentially of $SiO_2$ and $TiO_2$. In an alternative embodiment the $TiO_2$ containing silica glass is an uncerammed glass-ceramic precursor glass. Providing oxide bulk glass body 38 preferably includes providing an oxide bulk glass body 38 being a silica glass, preferably with at least 100 ppm OH wt., more preferably with at least 500 ppm wt. OH, and most preferably at least 800 ppm wt. OH. In a preferred embodiment the OH containing silica glass is a direct deposit high purity fused silica glass. In an alternative the silica glass body is a batch melted glass with <99% $SiO_2$. Providing oxide bulk glass body 38 preferably includes providing an uncerammed glass-ceramic precursor glass, preferably with the uncerammed glass-ceramic precursor glass cerammed after the acid etching of the glass body. In a preferred embodiment the uncerammed glass-ceramic precursor glass body 38 is an aluminosilicate glass green body. In an embodiment the uncerammed glass-ceramic precursor glass is a lithium aluminosilicate glass body. Preferably glass body 38 is comprised of a glass as described herein and in accordance with the inventive methods.

Figure 10A:
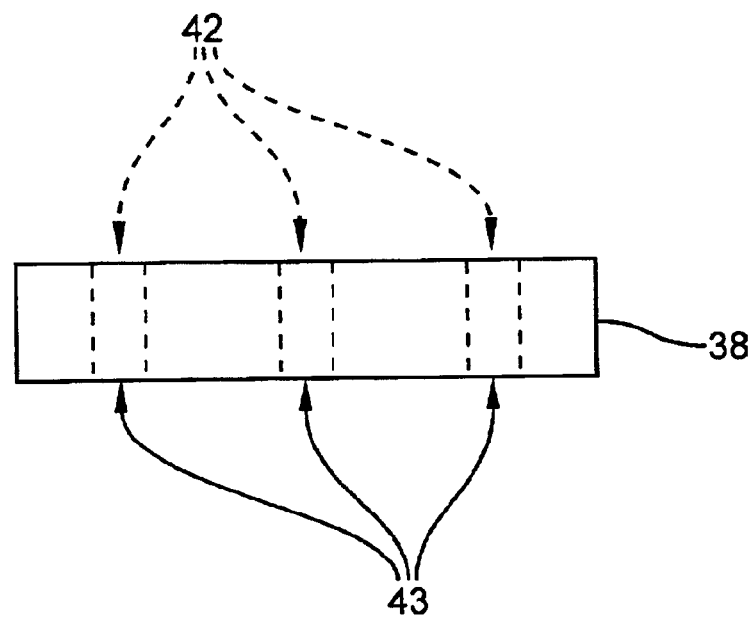
FIGS. 10A–10B show embodiments of the invention.
Figure 10B:
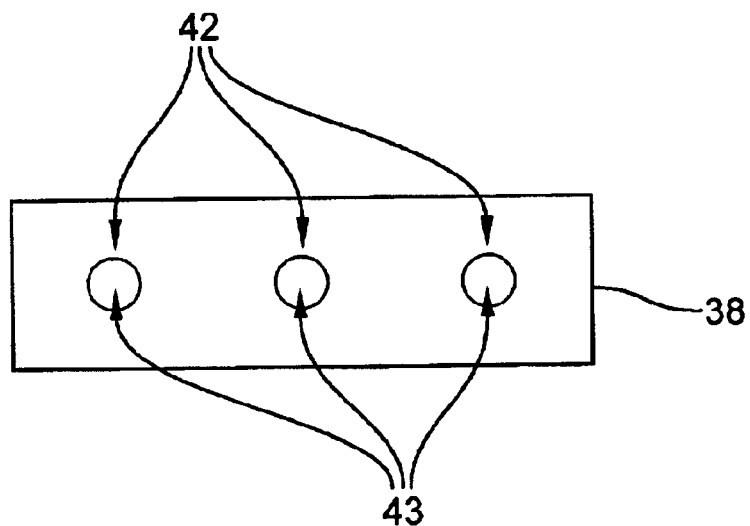
Figure 11:
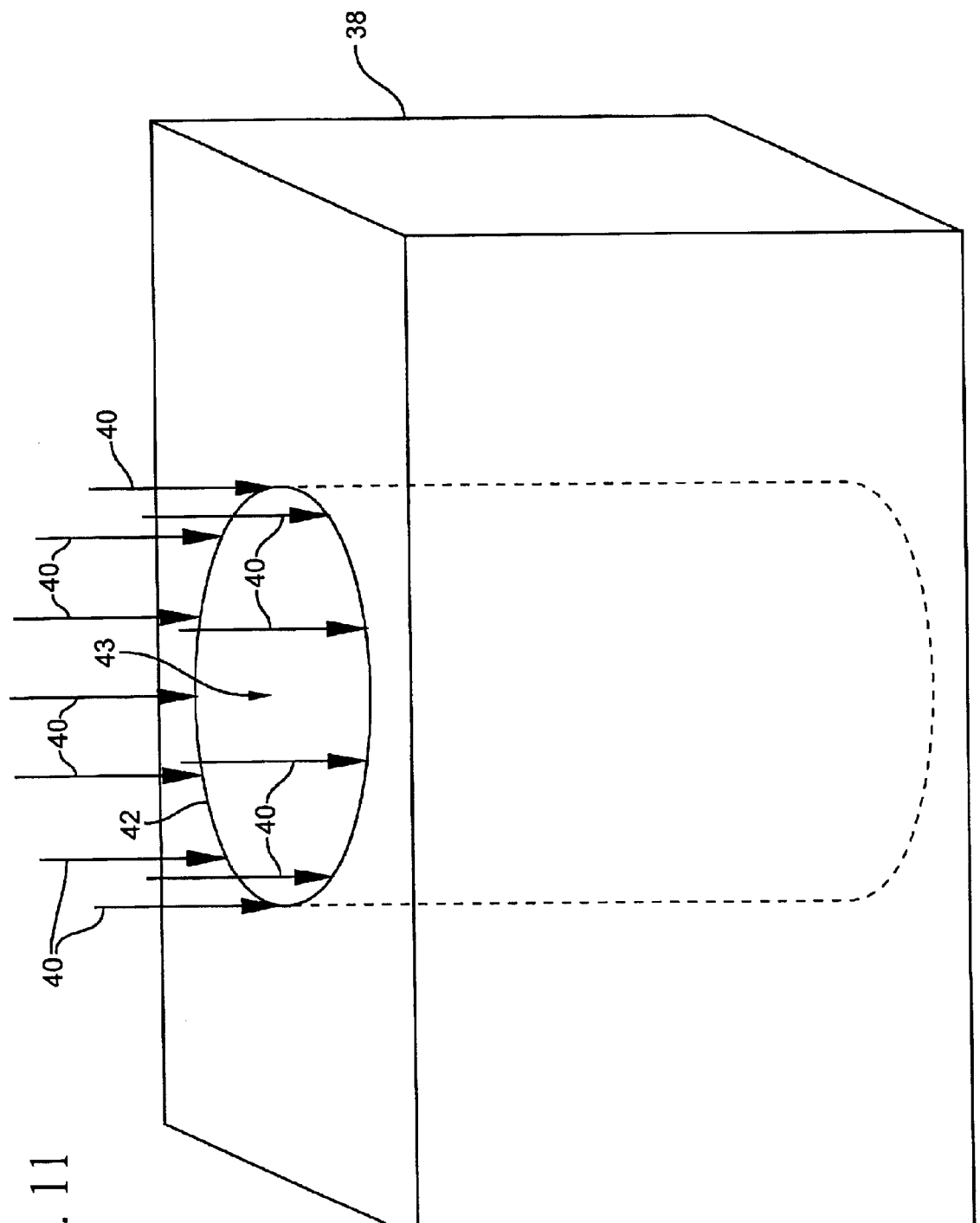
FIG. 11 shows an embodiment of the invention.
Figure 12A:
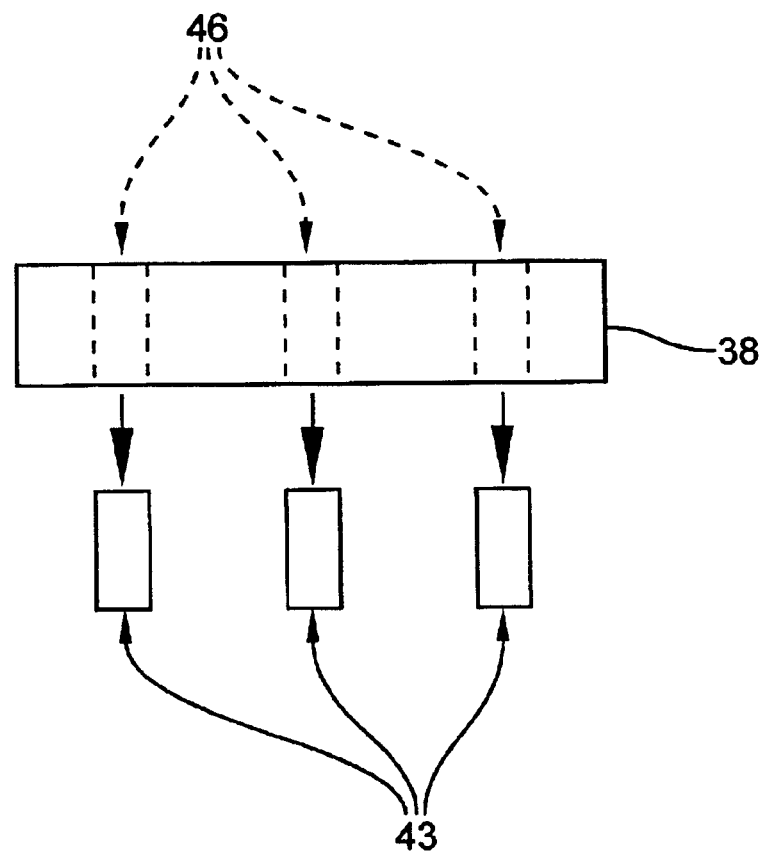
FIGS. 12A–12B show embodiments of the invention.
Figure 12B:
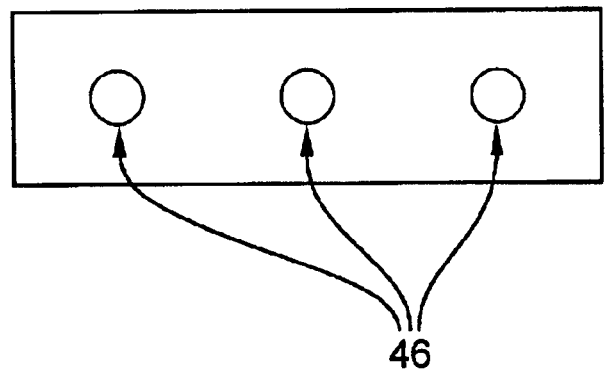
Figure 13:
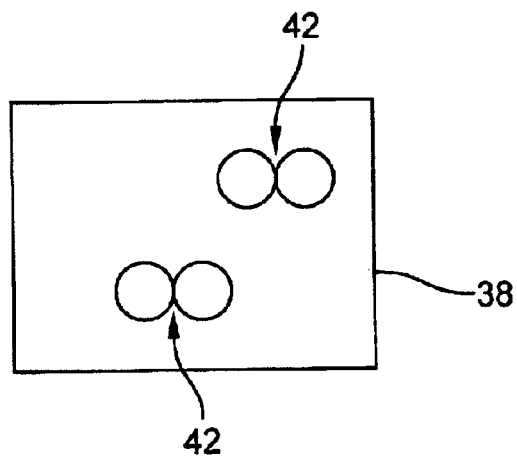
FIG. 13 shows an embodiment of the invention.
Figure 14A:
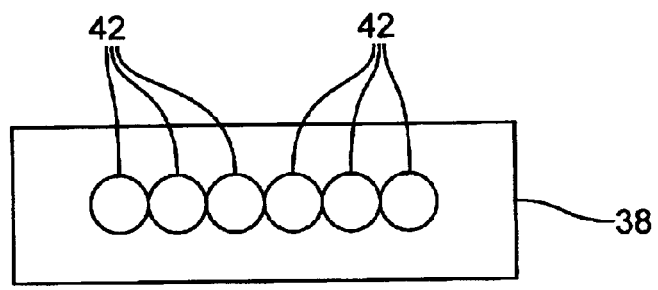
FIGS. 14A–14B show embodiments of the invention.
Figure 14B:
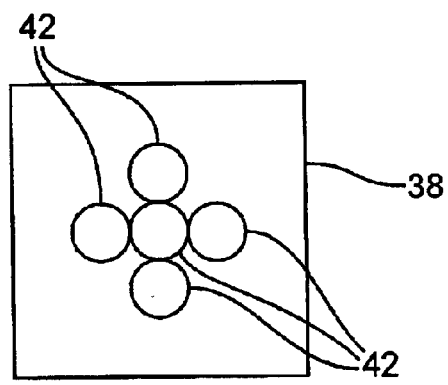
Figure 15A:
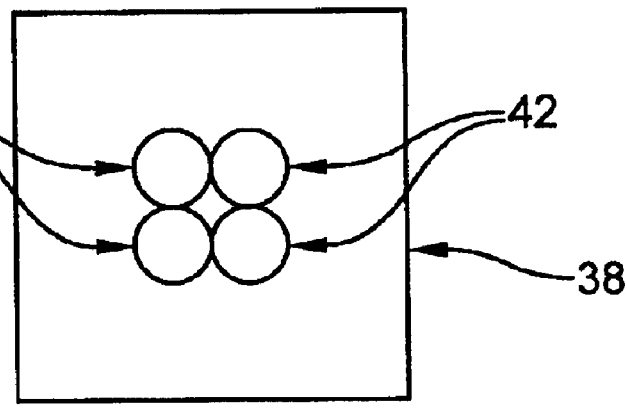
FIGS. 15A–15D show embodiments of the invention.
Figure 15B:
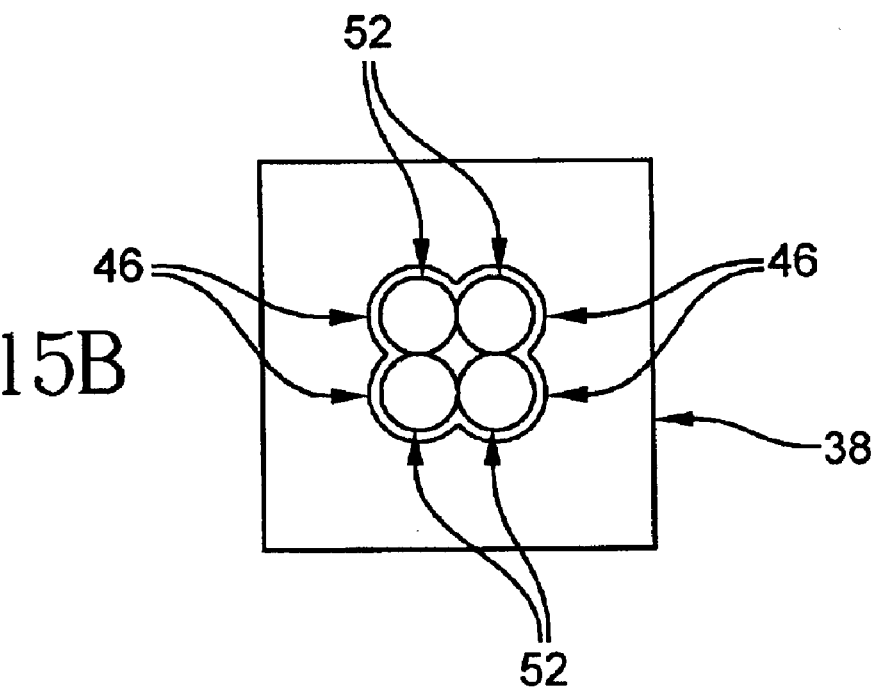
Figure 15C:
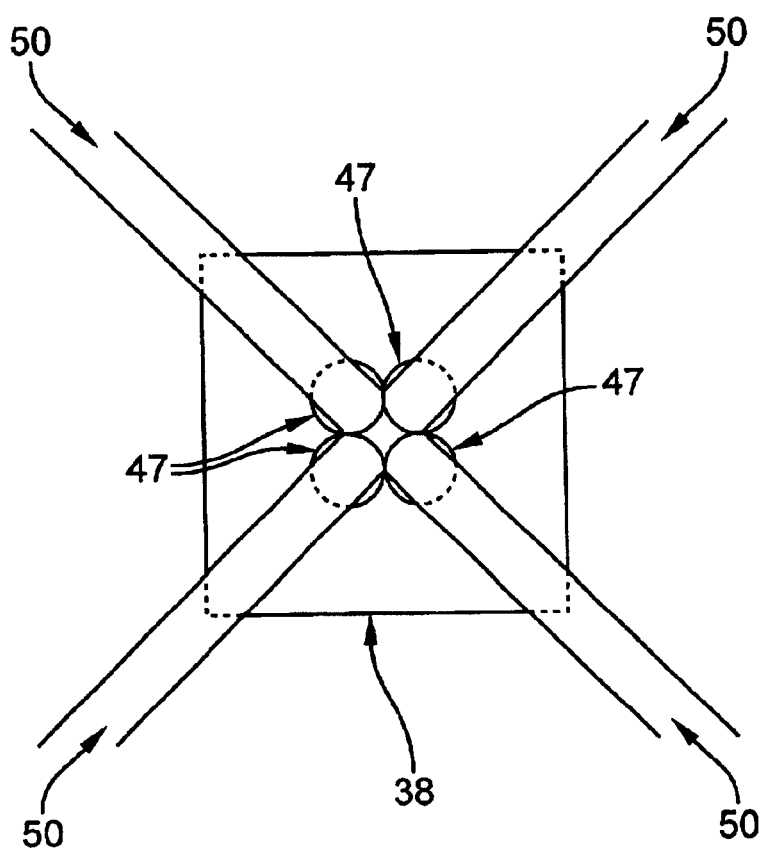
Figure 15D:
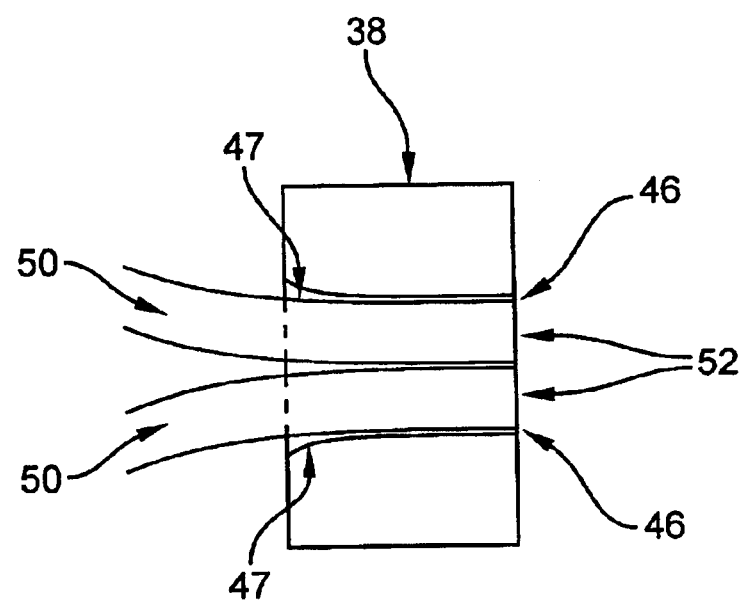
Figure 15E:
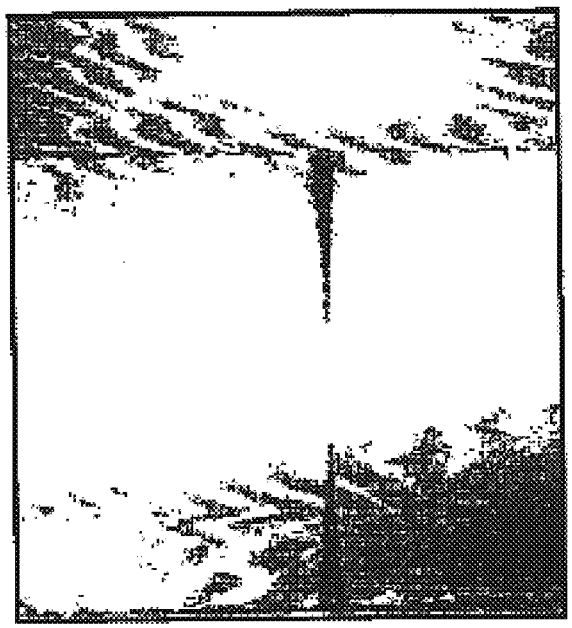
FIGS. 15E–15H are photomicrographs showing details of the invention.
Figure 15F:
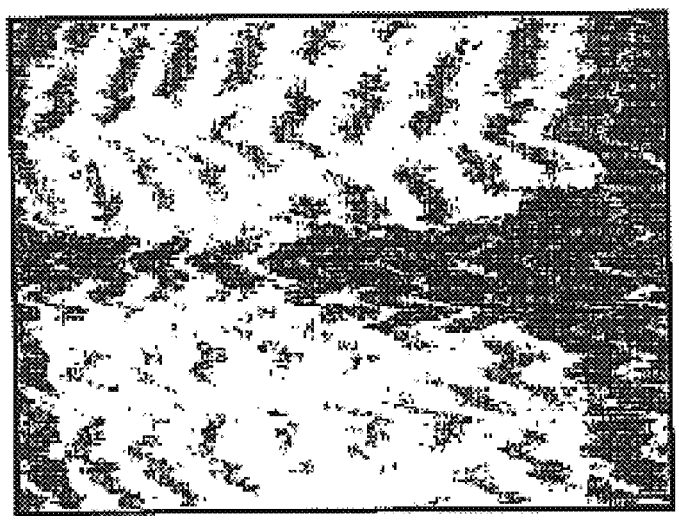
Figure 15G:
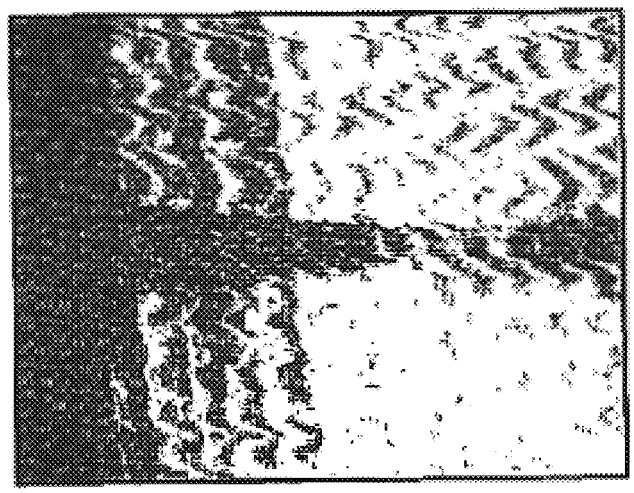
Figure 15H:
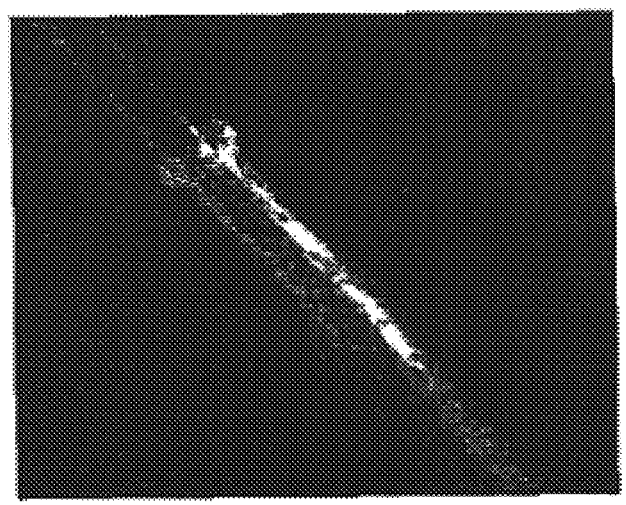

Tracing hole precursor track 42 through oxide bulk glass body 38 preferably includes tracing an outline shell hole precursor track 42 such as shown in FIGS. 10A, 10B, and 11 where the outline shell hole precursor track 42 surrounds an unexposed center glass volume 43. As shown in FIGS. 10A–11, traced outline shell hole precursor track 42 has columnary cylinder shell geometry wherein the acid etching of bulk glass body 38 detaches surrounded unexposed center glass volume cylinder 43 from its surrounding glass body 38 with the unexposed center glass volume 43 removed as shown in FIGS. 12A–B to provide precise optical fiber receiving hole 46. In an embodiment two adjacent outline shell hole precursor track patterns are traced to form a figure eight doublet for receiving and positioning two optical fibers adjacent to on another, such as shown in FIG. 13. In further embodiments more than two adjacent outline shell hole precursor track cylinders are traced adjacent to one another in a series or matrix to provide for the reception and positioning of a plurality of optical fiber adjacent to one another in a predetermined series or matrix pattern, such as shown in FIGS. 14–15D. The adjacent traced outline shell hole precursor tracks 42 of FIG. 15A are etched to provide optical fiber receiving holes 46 for hole contained optical fibers 52 as shown in FIGS. 15B and 15D. As shown in FIGS. 15C–D, at the backside fiber insertion entrance of glass body 38 the fiber receiving holes 46 include a tapered fiber funnel 47 for facilitated insertion of fiber 50 into fiber receiving holes 46. As shown in FIGS. 15E–G, the acid etching of the hole precursor track forms a tapered funnel shape at the bulk glass surface which can be utilized as a fiber receiving funnel to facilitate insertion of an optical fiber, such as shown in FIG. 15H (5× magnification) with an optical fiber inserted into the acid etched tapered funnel section of a fiber receiving hole.

Figure 16:
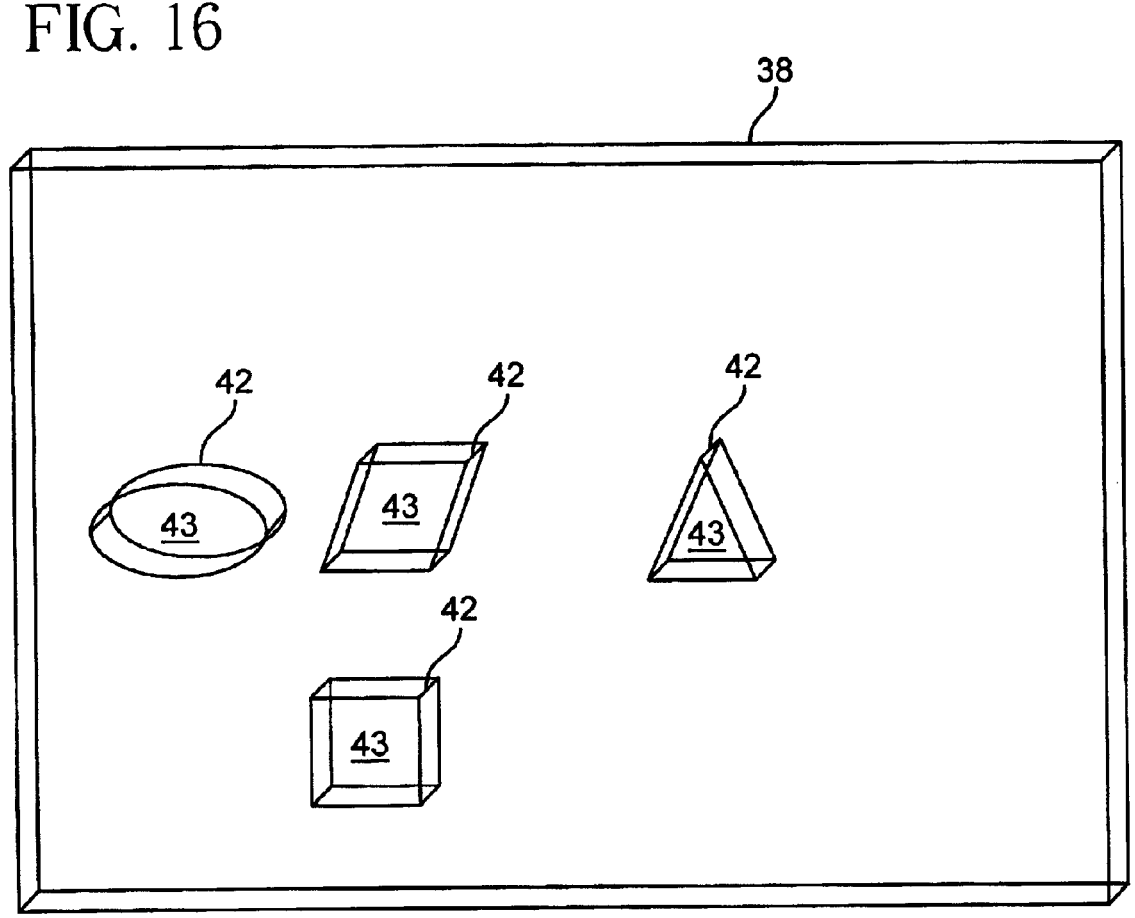
FIG. 16 shows embodiments of the invention.
Figure 17A:
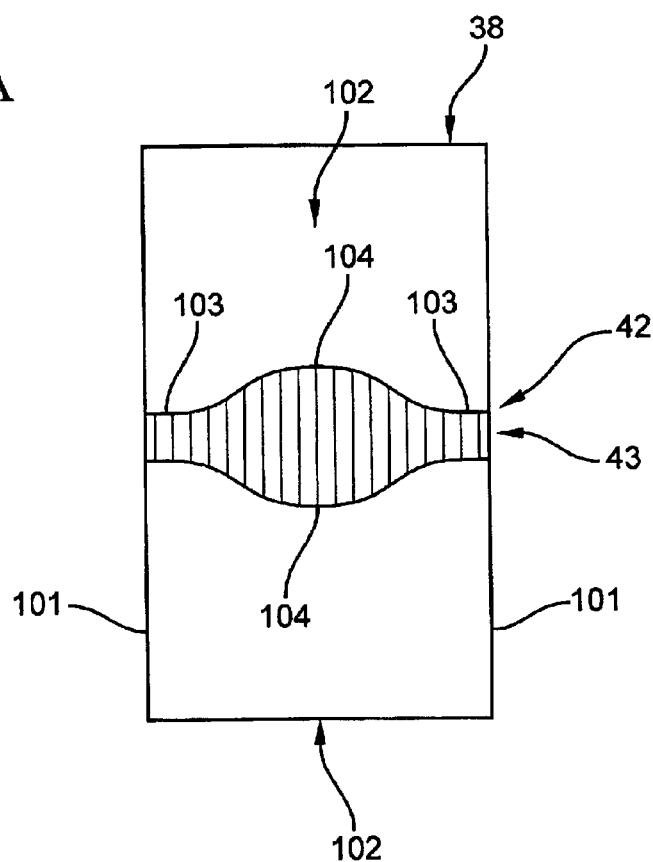
FIGS. 17A–17C show embodiments of the invention.
Figure 17B:
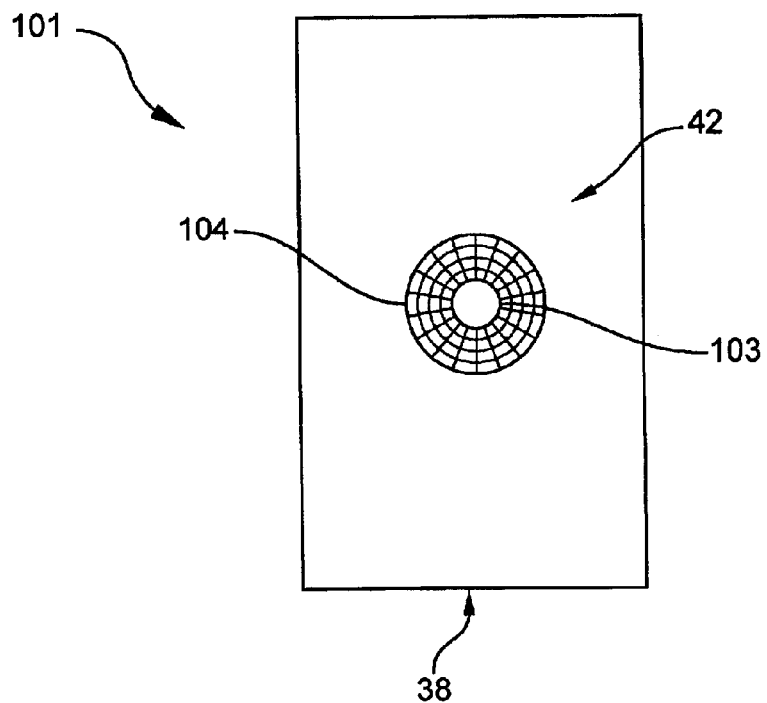
Figure 17C:
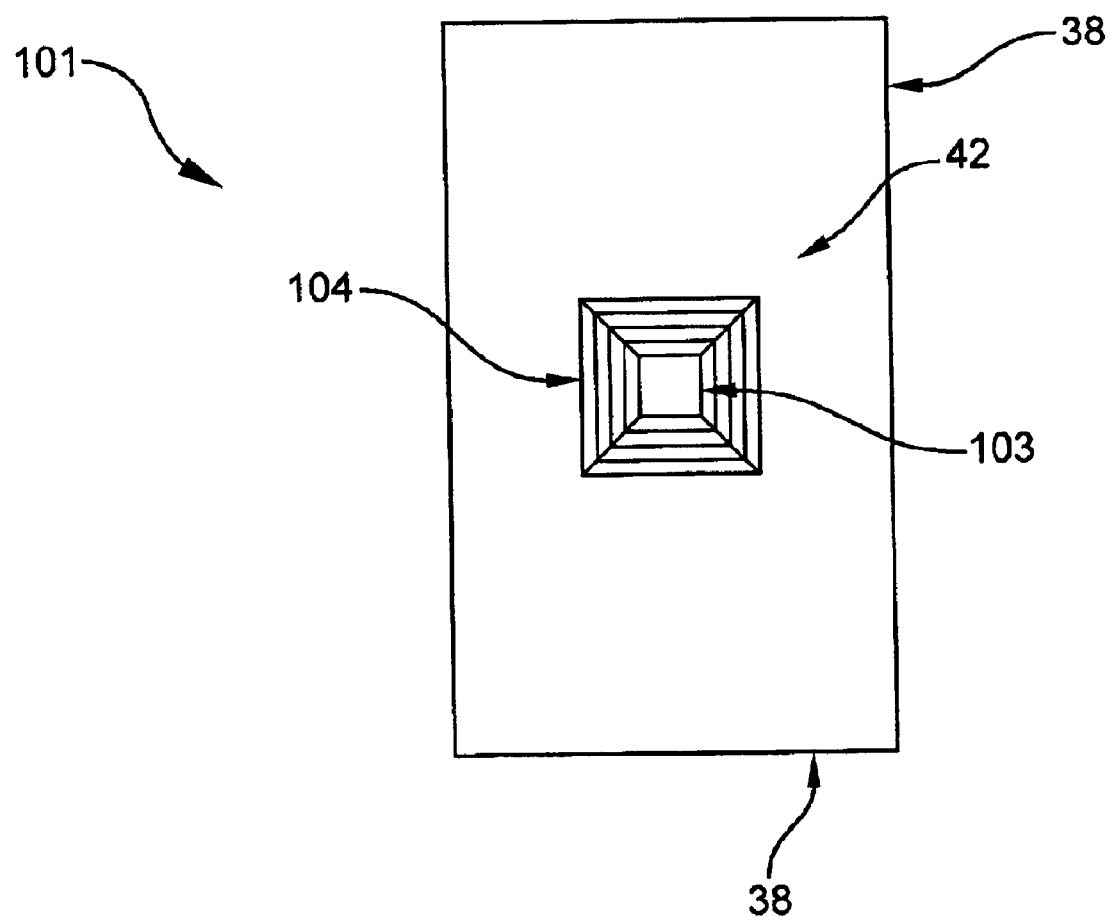

In an alternative embodiment the outline shell hole precursor track pattern can have a non-circular cross section shape such as a triangle, square, rectangle, diamond and oval cross section shape such as shown in FIG. 16. Preferably the outline shell hole precursor track has a progressively varying swelled middle cross-section. Preferably the provided oxide bulk glass body has a first surface and a second distal surface and a thickness middle between said first and second surfaces with the outline shell hole precursor track having an expanding cross-section with the expanding cross-section expanding from a minimum cross-section proximate at least one of the surfaces to a maximum cross-section proximate the thickness middle. As shown in FIG. 17, the swelled progressively varying cross section outline shell hole precursor track 42 has a minimum cross-section 103 proximate glass body surfaces 101 and a maximum cross-section 104 which progressively expands from the surfaces to the thickness middle to provide for a preferential etching that results in high precision holes after acid etching that have a consistent uniform cross-section. As shown in FIGS. 17A–B, the swelled expanding cross-section outline shell hole precursor track 42 can be formed by tracing circles in successive parallel planes, such as tracing a first circle by translating the stage and glass body in a circular motion then moving the focus (translating stage) further into the glass and tracing a second circle by translating the stage and glass body, and continuing with successive circles with the diameter of the circles traced expanding as the laser focus progresses deeper into the glass body toward the thickness middle. As shown in FIG. 17C, the expanding cross-section outline shell hole precursor track 42 can have a noncircular cross-section, such as geometries shown in FIG. 16.

The invention includes a bulk oxide glass precision hole precursor preform body comprising a bulk oxide glass body containing at least one laser traced outline shell hole precursor track pattern traversing through the bulk oxide glass body with a swelled middle. The bulk oxide glass precision hole precursor preform body includes a bulk oxide glass body having a first surface and a second surface and containing at least one laser traced outline shell hole precursor track pattern which has an expanding cross-section with the expanding cross-section expanding from a minimum cross-section proximate at least one of the surfaces to a swelled maximum cross-section proximate said thickness middle. In a preferred embodiment the laser traced outline shell hole precursor track pattern includes a fiber funnel tapered section proximate the first surface and the minimum cross-section is proximate the second distal surface. Preferably the glass has a bulk glass thickness of at least 0.25 mm between the surfaces. Preferably the preform body laser traced outline shell hole precursor track pattern is acid etchable into a precise hole for receiving an optical fiber. Preferably the laser traced outline shell hole precursor track pattern expanding cross-section has a circular geometry. In an embodiment the expanding cross-section has a straight-sided geometry such as a triangle, a rectangle, a square, or a diamond. The glass body is comprised of a glass as described herein and in accordance with the inventive methods.

EXAMPLES

Figure 18:
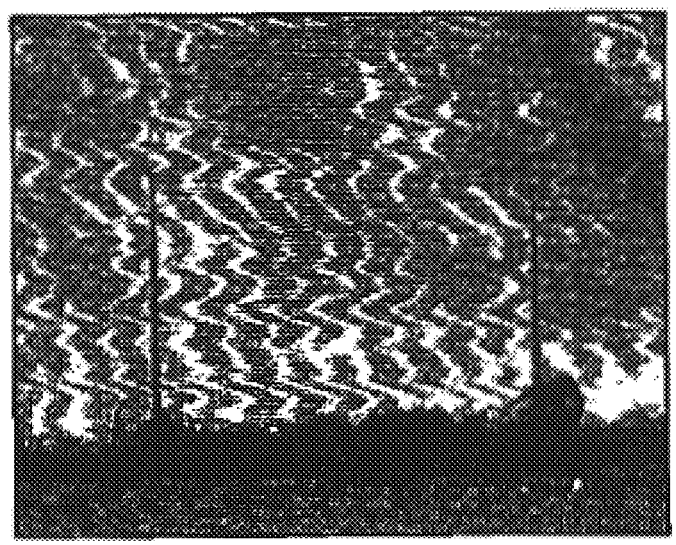
FIGS. 18–35 are photomicrographs showing detail embodiments of the invention.

The invention has provided long optical waveguide ferrule holes in bulk silica glass using a 0.26-NA objective focussing lens. We have created long holes in bulk silica glass samples up to 3 cm thick. Etched holes 18 $\mu$m in diameter and about 0.8 mm long are shown in photomicrograph FIG. 18, which had been etched in $SiO_2$ after irradiating the laser radiation track (hole precursor track pattern) with 10-$\mu$J and 15-$\mu$J, 40-fs pulses laser beams (the glass bulk sample was translated with the speed of 100 $\mu$m/s with the irradiating laser beam kept stationary).

Figure 19:
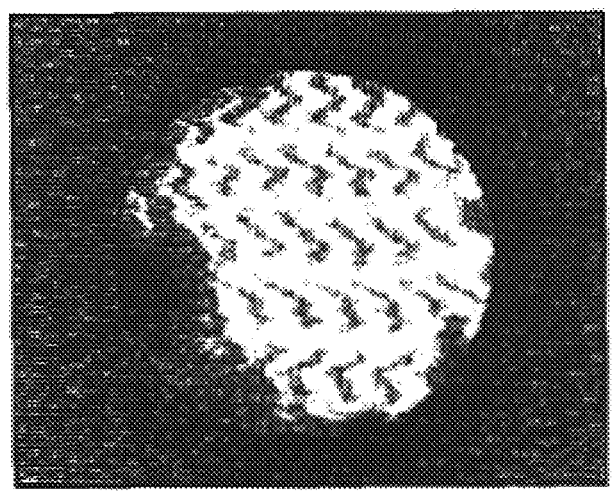
Figure 20:
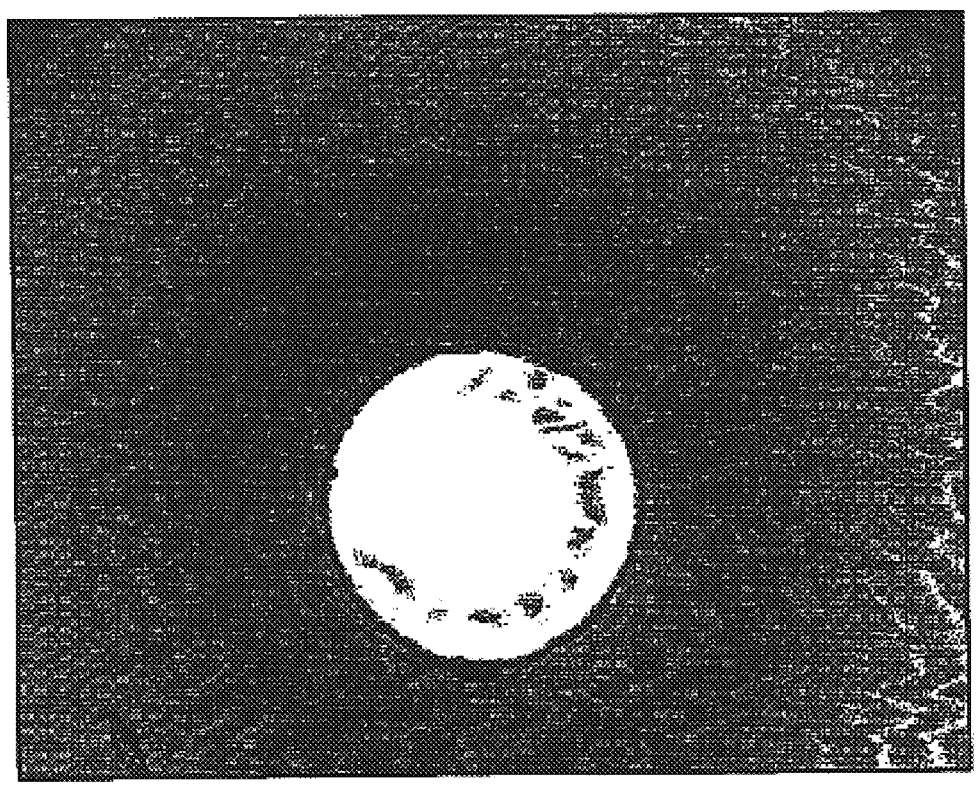
Figure 21:
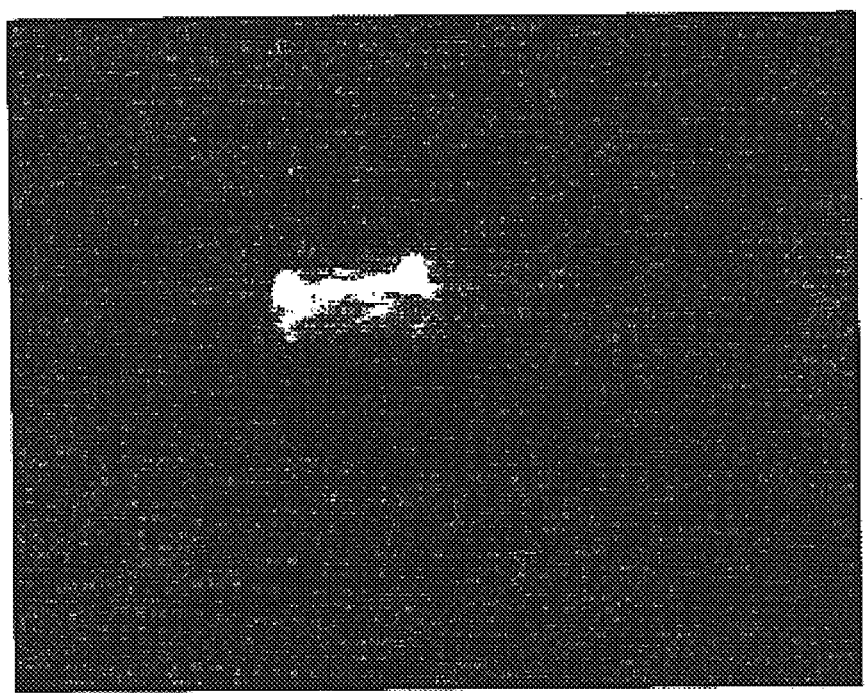
Figure 22:
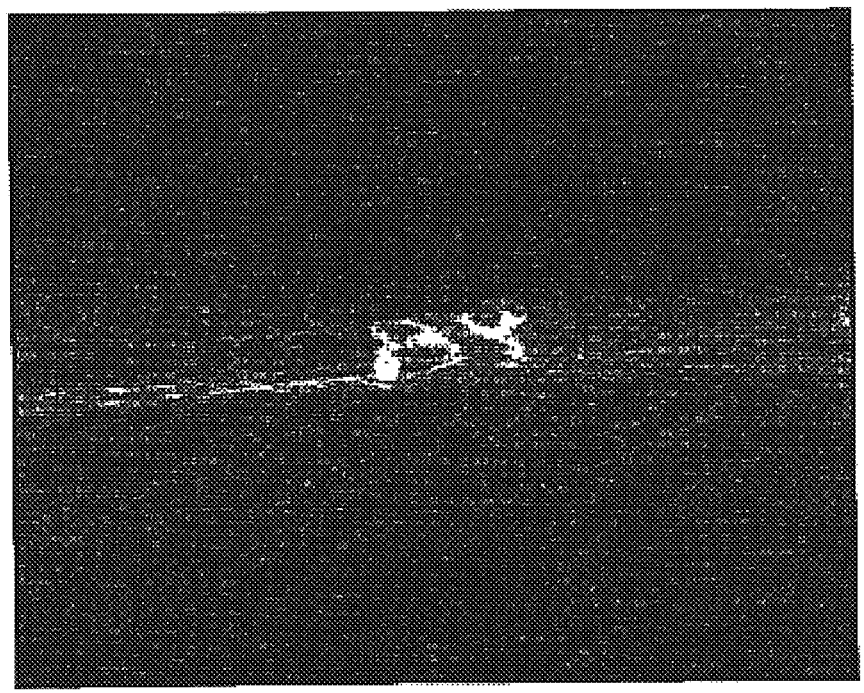
Figure 23:
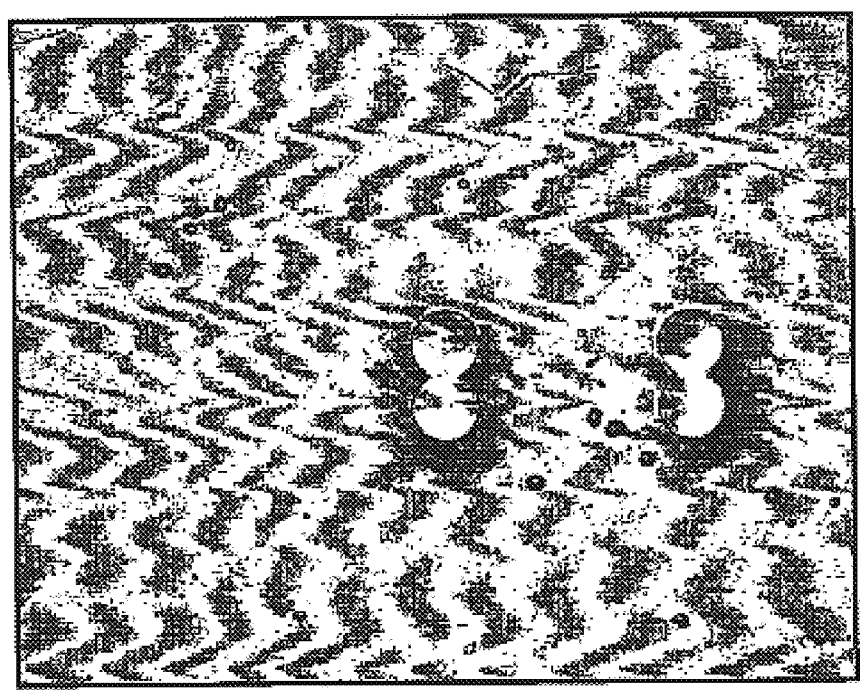
Figure 24:
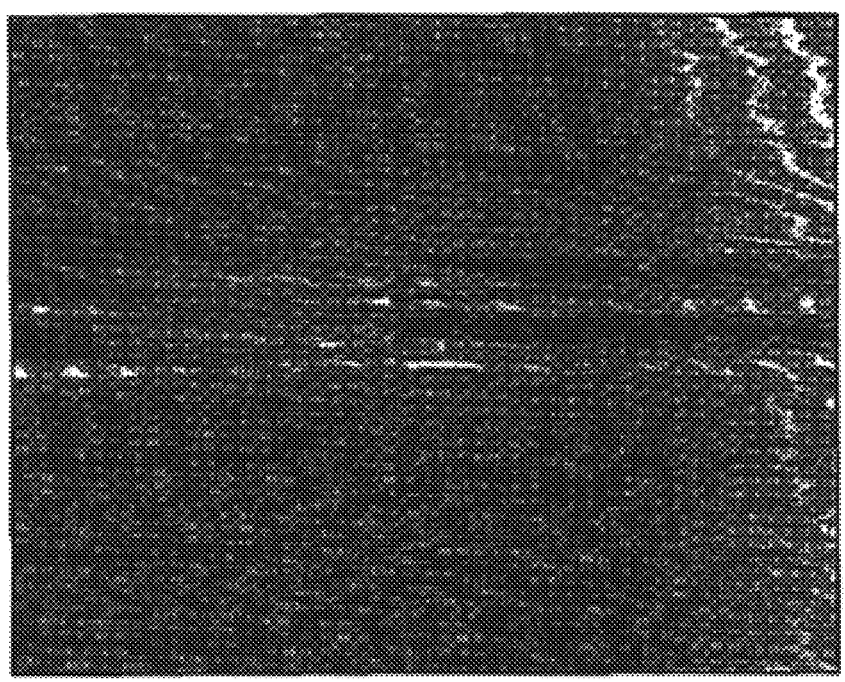

Holes of various predetermined diameters are formed by irradiating laser beam writing a helix-like laser radiation track pattern outline shell hole precursor track that surrounds an unexposed center glass volume and etching the irradiated damaged area. The inner unexposed part surrounded by the surrounding track pattern is detached from the bulk glass body by the acid etch and can thus be removed. A 120-$\mu$m diameter cylinder outline shell was irradiated in a 2-mm thick piece of glass and then etched in a 15% HF acid aqueous solution for 30 minutes in an ultrasonic bath. The stage and received glass body was translated to write successive circles to form a cylinder. The diameter of the circles was about 120 $\mu$m, the separation between the planes of the circles was about 10 $\mu$m using a 15 $\mu$J pulse energy, 40 fs pulses, 800 nm wavelength, 20 kHz, and 250 $\mu$m/second writing speed. The glass had a bulk thickness of 2 mm, and was acid etched in 15% HF solution ultrasonic bath, heated to about 55° C., for 0.5 hour and produced a cylindrical hole of about 200 $\mu$m in diameter. As a result a cylindrical 200-$\mu$m hole was fabricated as shown in FIG. 19 (photomicrograph taken at 20× magnification). The blurred dark spots are the contaminations on the back surface. FIG. 20 is another photomicrograph of a hole formed in silica glass in accordance with the invention. FIG. 21 is another photomicrograph of a hole formed in silica glass in accordance with the invention. Holes like this made as an array can be used for aligning and holding optical waveguide fibers in photonic devices. FIG. 22 is another photomicrograph of a hole formed in silica glass in accordance with the invention with a fiber held and received therein. FIG. 23 is a photomicrograph of an array of adjacent fiber holding holes formed in silica glass in accordance with the invention. FIG. 24 is a photomicrograph side view of two adjacent fiber holding holes formed in silica glass in accordance with the invention, with the doublet holding two optical fibers.

Figure 25:
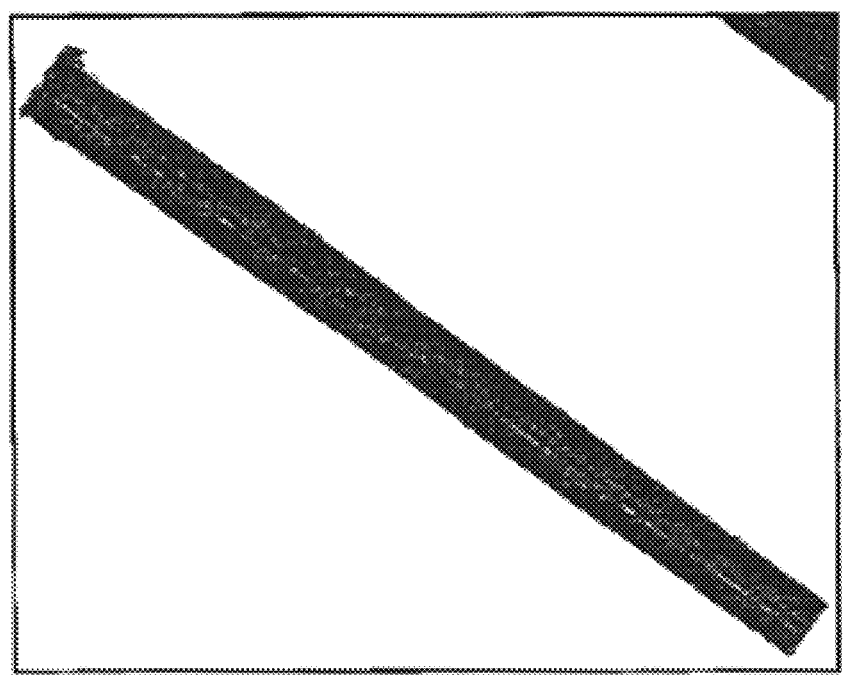
Figure 26:
Figure 27:

FIG. 25 is a photomicrograph of a precision hole formed in silica glass in accordance with the invention from an expanding cross-section outline shell hole precursor track with minimum cross-section diameters proximate the surfaces and a maximum cross-section diameter proximate the thickness middle. FIG. 26 is a photomicrograph of the glass pin removed from the bulk glass body of FIG. 25 to provide a hole after etching in accordance with the invention. The glass pin is the unexposed center glass volume 43 that was surrounded by the outline shell hole precursor track. FIG. 27 is a photomicrograph the FIG. 25 hole containing a received optical fiber in accordance with the invention.

The invention enables drilling of holes of predefined size with fine spatial accuracy in glass. The application of the formed holes is preferably to receive optical waveguide fibers therein. The shape of the laser track pattern (exposed hole precursor track pattern) may be virtually any shape traceable with the laser beam, while the depth and the aspect ratio of the final form hole is further determined by etching. An advantage of the invention is the ability to perform micromachining of thick glass samples (up to several millimeters), preferably in thick bulk glass bodies with greater than submillimeter thickness, preferably glass body thickness of at least about 2 mm. The choice of glass includes silica based glasses with this method being applied to a wide variety of glasses that are transparent at the exposing laser wavelength of the irradiating laser producing $\geq 5$ $\mu$J pulse energy with subpicosecond region laser pulse duration and can be acid etched. Preferably the laser sources of the invention produce sufficient pulse energy (around 5 $\mu$J or more) and the laser pulse duration being in the subpicosecond region, most preferably below 100 fs.

Figure 28:
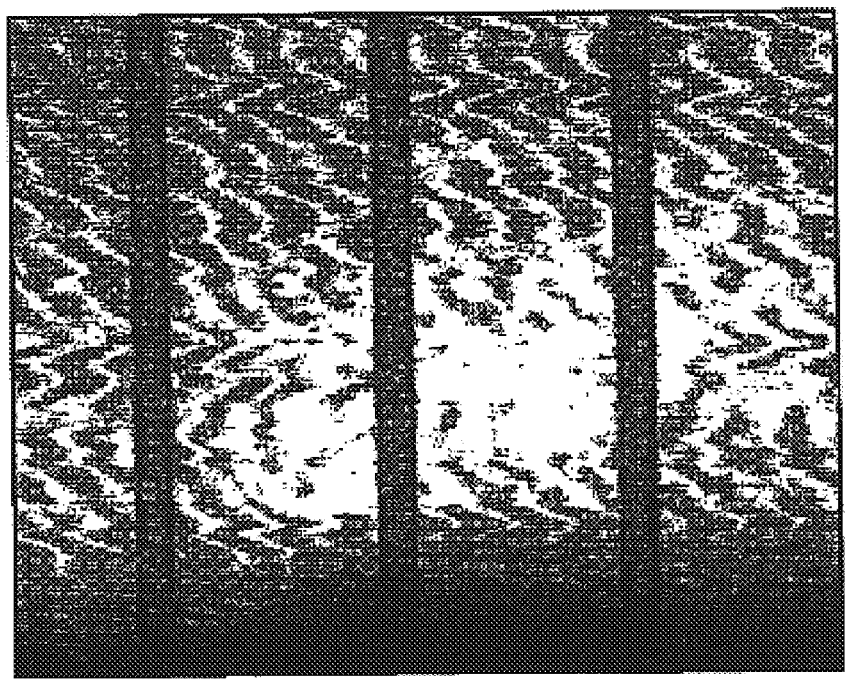
Figure 29:

FIG. 28 is a photomicrograph of three outline shell hole precursor track patterns, with the track patterns having a nonvarying nonexpanding cylindrical cross-section. FIG. 29 is a photomicrograph of the silica glass sample of FIG. 28 after acid etching the three hole precursor track patterns, with the photomicrograph showing that without a swelled expanding cross-section a narrow waist is formed at the thickness middle of the glass body.

Figure 30:
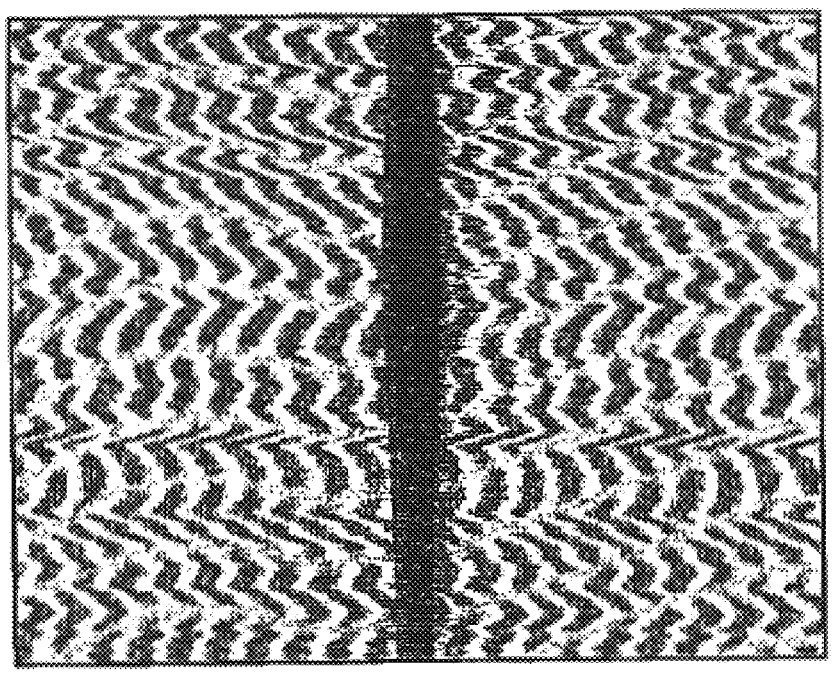
Figure 31:
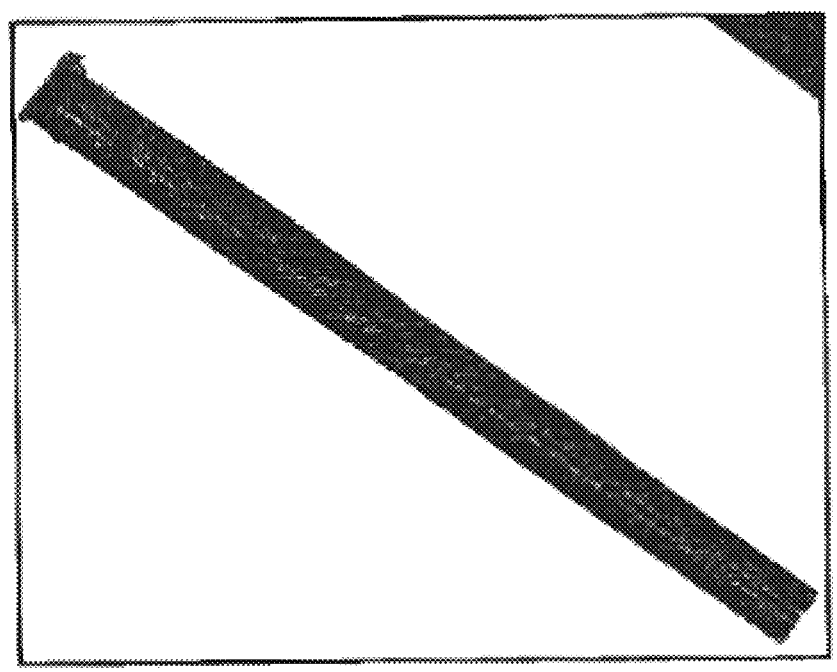

FIG. 30 is a photomicrograph of an outline shell hole precursor track pattern in a silica glass body, with the outline shell hole precursor track pattern swelled in the middle to produce a cylindrical hole. In FIG. 30 the expanding traced outline shell has an minimum cross-section diameters proximate the glass body surfaces and maximum circular cross-section diameters proximate the glass body thickness middle. The glass body thickness and outline shell pattern length of FIG. 30 is 2 mm, with the cross-section diameter at the ends 60 µm, and the middle cross-section swelled to 120 µm. FIG. 31 is a photomicrograph of the silica glass sample of FIG. 30 after acid etching the expanding cross-section outline shell with the expanded cross-section providing a precision hole with a cylindrical shape having a fluctuation in diameter of no more than 5% (diameter of precision hole of FIG. 31 is 127 µm). Preferably for a glass body thickness of at least about 2 mm, the thickness middle cross-section diameter is swelled at least 30%, more preferred ≧50%, ≧70%.

Figure 32:
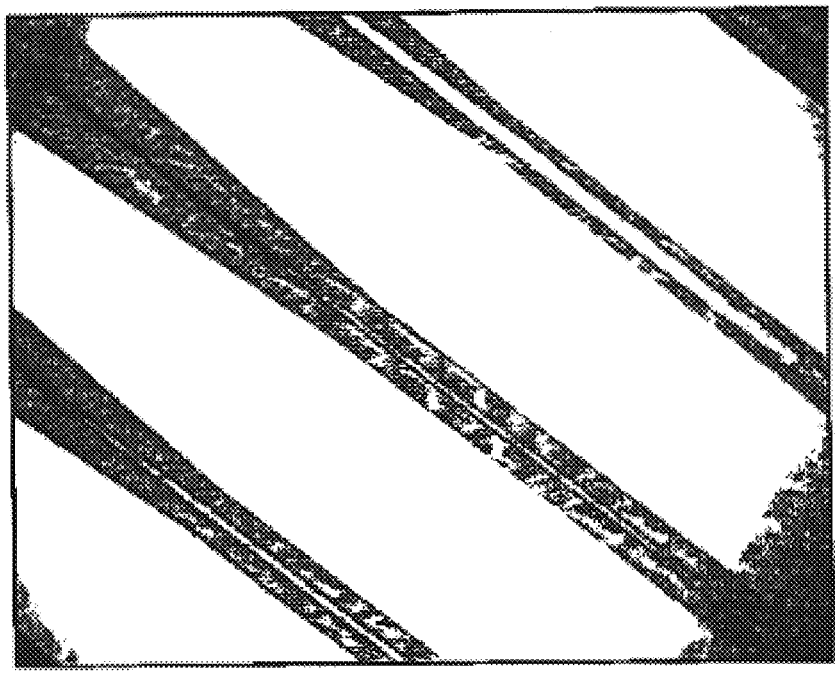
Figure 33:
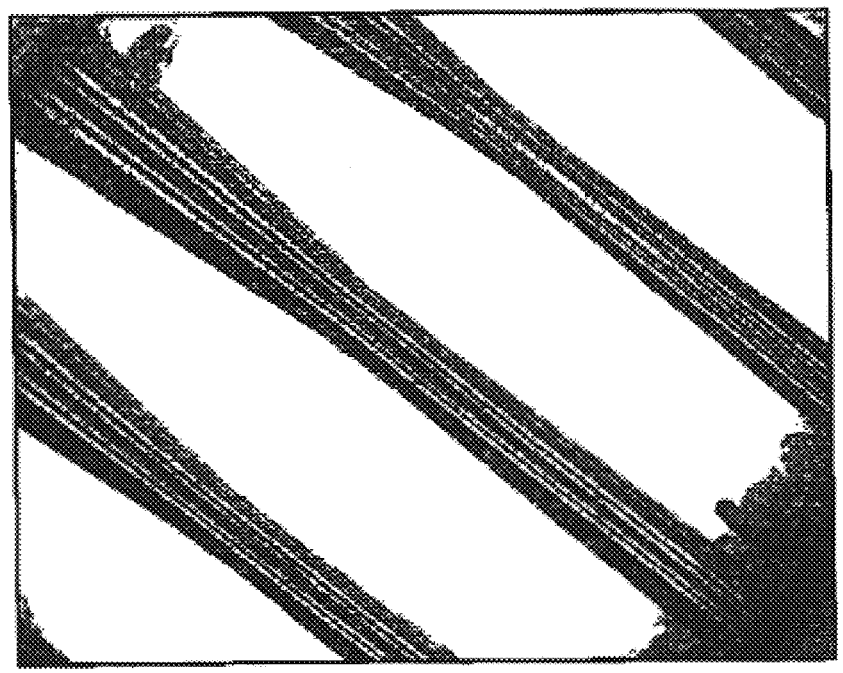
Figure 34:
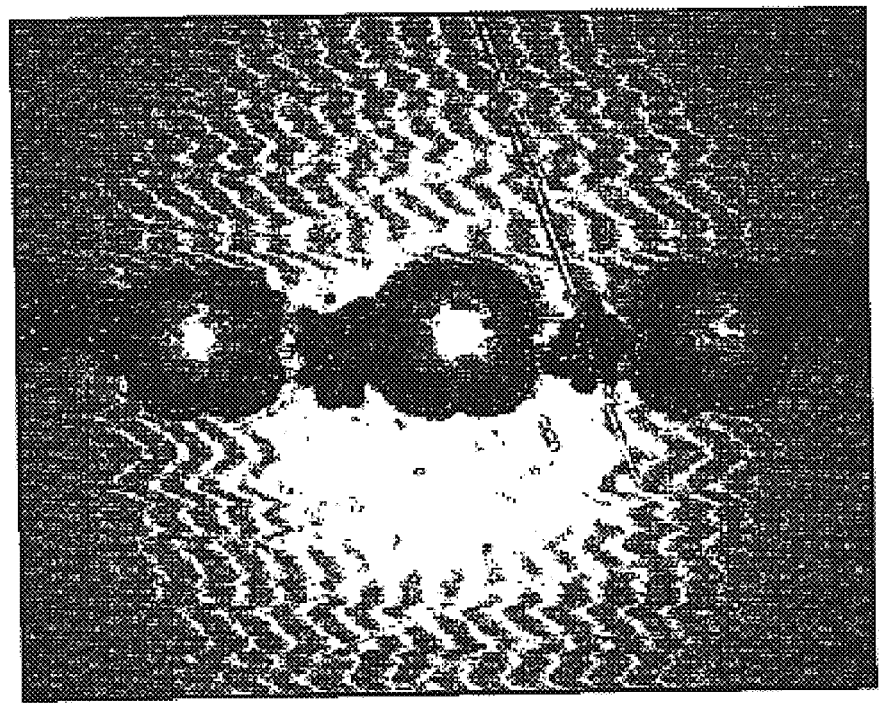
Figure 35:
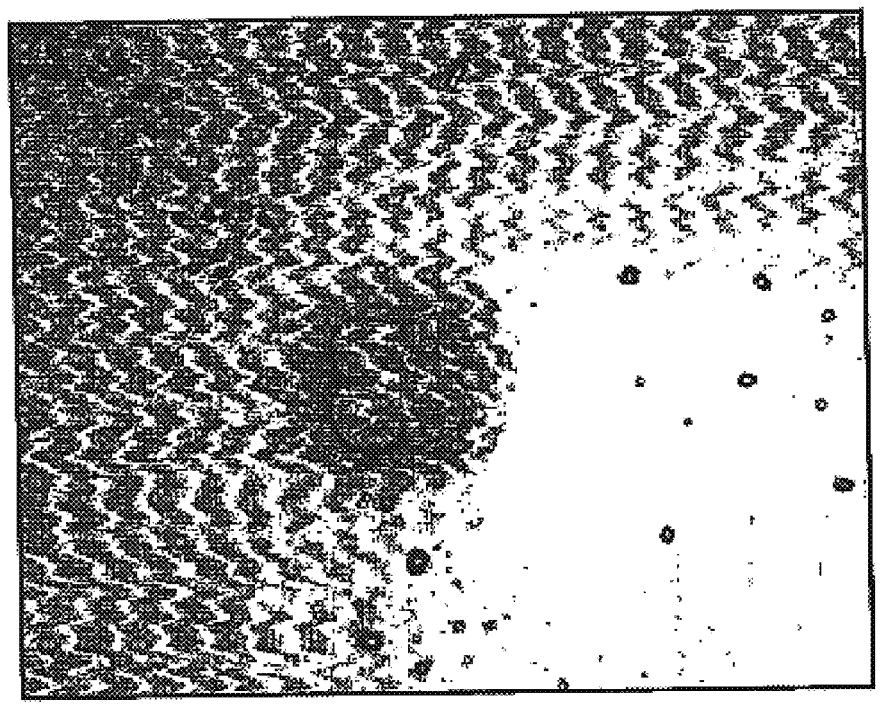

FIG. 32 is a micrograph of three sets of adjacent outline shell hole precursor track patterns in a silica glass body with each set having different diameters. One end of the outline shell hole precursor track pattern includes a tapered funnel region which provides for the formation of a tapered fiber funnel for insertion of optical fibers. FIG. 33 is a photomicrograph of the silica glass body of FIG. 32 after acid etching, which shows that a narrow waist is formed in the thickness middle since the outline shell hole precursor track pattern did not include an expanding cross-section at the thickness middle. FIG. 34 is a photomicrograph of the fiber funnel end surface of the glass body of FIG. 32 after acid etching. FIG. 35 is a photomicrograph of a section of the side opposite of the fiber funnel end after acid etching, showing four adjacent holes for containing optical fiber ends such as shown in FIG. 15B. These fiber funnel ends can accommodate an optical fiber with its polymer protective coating while the opposite end contains stripped optical fiber ends without their polymer protective coating.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method of making an optical fiber device, said method comprising:
    providing an ultrashort pulse laser for producing a laser output with a wavelength λ, said laser output having a subpicosecond laser pulse duration,
    providing a laser output focussing lens for focussing said laser output, said lens having an air working distance ≧3 mm and a ≦1 NA numerical aperture,
    providing a controllable positioning translation stage, said positioning translation stage for receiving an oxide bulk glass body,
    providing an oxide bulk glass body, said oxide bulk glass body having a transparency at λ of at least 90%/cm,
    positioning said oxide bulk glass body with said stage wherein said glass body is received by said stage,
    focussing said laser output through said laser output focussing lens to produce a subpicosecond laser pulse duration focus proximate said oxide bulk glass body,
    translating said oxide bulk glass body relative to said subpicosecond laser pulse duration focus wherein said focus traces a hole precursor track pattern through said oxide bulk glass body,
    acid etching said oxide bulk glass body in an agitated heated acid bath wherein said focussed traced hole precursor track pattern is etched into an optical fiber receiving hole,
    cleansing said acid etched oxide bulk glass body with said etched optical fiber receiving hole,
    inserting an optical fiber into said optical fiber receiving hole to provide a hole contained optical fiber.

2. A method as claimed in claim 1, wherein providing said ultrashort pulse laser includes providing a <100 fs pulse laser for producing a laser output having a <100 fs laser pulse duration.

3. A method as claimed in claim 1, wherein providing said ultrashort pulse laser includes providing a <50 fs pulse laser for producing a laser output having a <50 fs laser pulse duration.

4. A method as claimed in claim 1, wherein providing said ultrashort pulse laser includes providing a ≦40 fs pulse laser for producing a laser output having a ≦40 fs laser pulse duration.

5. A method as claimed in claim 1, wherein providing said ultrashort pulse laser includes providing a ≧5 µJ pulse energy laser for producing a laser output having a ≧5 µJ pulse.

6. A method as claimed in claim 1, wherein acid etching includes ultrasonically agitating said acid bath.

7. A method as claimed in claim 1, wherein acid etching includes heating said acid bath to at least 50° C.

8. A method as claimed in claim 1, wherein acid etching includes providing a hydrofluoric acid bath.

9. A method as claimed in claim 8, wherein said acid bath is an aqueous solution of >5% HF vol. %.

10. A method as claimed in claim 1, wherein providing an oxide bulk glass body includes providing an oxide bulk glass body with a λ transparency ≧95%/cm.

11. A method as claimed in claim 1, wherein providing said ultrashort pulse laser includes providing a λ<1000 nm laser.

12. A method as claimed in claim 1, wherein providing said laser includes providing a laser with a wavelength λ in the range of 800±100 nm.

13. A method as claimed in claim 1, wherein λ is centered about 800 nm.

14. A method as claimed in claim 1, wherein providing an oxide bulk glass body includes providing a $TiO_2$ containing silica glass body.

15. A method as claimed in claim 14, wherein said $TiO_2$ containing silica glass body contains from 5 to 10 Wt. % $TiO_2$.

16. A method as claimed in claim 1, wherein providing an oxide bulk glass body includes providing a silica glass with at least 100 ppm wt. OH.

17. A method as claimed in claim 1, wherein providing an oxide bulk glass body includes providing a silica glass with at least 500 ppm wt. OH.

18. A method as claimed in claim 1, wherein providing an oxide bulk glass body includes providing an uncerammed glass-ceramic precursor glass.

19. A method as claimed in claim 18, wherein providing an unceramed glass-ceramic precursor glass includes providing an aluminosilicate glass green body.

20. A method as claimed in claim 18, wherein providing an unceramed glass-ceramic precursor glass includes providing an a lithium aluminosilicate glass-green body.

21. A method as claimed in claim 18, wherein providing an uncerammed glass-ceramic precursor glass comprises providing a photosensitive nucleated glass.

22. A method as claimed in claim 21, wherein said photosensitive nucleated glass forms lithium metasilicate microcrystalline phases.

23. A method as claimed in claim 18, wherein providing an uncerammed glass-ceramic precursor glass comprises providing a glass which is cerammable into a negative thermal expansion glass-ceramic body.

24. A method as claimed in claim 1, wherein providing an oxide bulk glass body includes providing a batch melted glass.

25. An optical fiber device made by the method of claim 1.

26. A method as claimed in claim 1, wherein said hole precursor track pattern through said oxide glass body comprises an outline shell hole precursor track which surrounds an unexposed center glass volume which is detached from said oxide glass body with said acid etching to provide said optical fiber receiving hole.

27. A method as claimed in claim 26 wherein said outline shell hole precursor track has a circular cross-section.

28. A method as claimed in claim 26 wherein said outline shell hole precursor track has a non-circular cross-section.

29. A method as claimed in claim 26 wherein said outline shell hole precursor track has a varying cross-section.

30. A method as claimed in claim 26 wherein said provided oxide bulk glass body has a first surface and a second distal surface and a thickness middle between said first and second surfaces, and said outline shell hole precursor track has an expanding cross-section with said expanding cross-section expanding from a first cross-section proximate at least one of said surfaces to an expanded wider cross-section proximate said thickness middle.

31. A method as claimed in claim 26 wherein said glass body has a thickness middle and said outline shell hole precursor track is swelled at said thickness middle.

32. A method of making an optical fiber holder, said method comprising:
providing an ultrashort pulse laser for producing a laser output with a wavelength $\lambda$, said laser output having a subpicosecond laser pulse duration,
providing a laser output focussing lens for focussing said laser output, said lens having an air working distance $\geq 3$ mm and $\leq 1$ NA numerical aperture,
providing a oxide bulk glass receiving stage, said stage for receiving an oxide bulk glass body,
providing an oxide bulk glass body, said oxide bulk glass body having a transparency at $\lambda$,
positioning said oxide bulk glass body with said stage wherein said glass body is received by said stage,
focussing said laser output through said laser output focussing lens to produce a subpicosecond laser pulse duration focus proximate said oxide bulk glass body,
tracing a hole precursor track pattern through said oxide bulk glass body with said subpicosecond laser pulse duration focus,
acid etching said oxide bulk glass body in an ultrasonic HF acid bath wherein said laser focus traced hole precursor track pattern is etched into an optical fiber receiving hole,
rinsing and drying said acid etched oxide bulk glass body with said etched optical fiber receiving hole to provide a optical fiber holder.

33. A method as claimed in claim 32, wherein providing said ultrashort pulse laser includes providing a <100 fs pulse laser for producing a laser output having a <100 fs laser pulse duration.

34. A method as claimed in claim 32, wherein providing said ultrashort pulse laser includes providing a <50 fs pulse laser for producing a laser output having a <50 fs laser pulse duration.

35. A method as claimed in claim 32, wherein providing said ultrashort pulse laser includes providing a <40 fs pulse laser for producing a laser output having a <40 fs laser pulse duration.

36. A method as claimed in claim 32, wherein providing said ultrashort pulse laser includes providing a $\geq 5$ $\mu$J pulse energy laser for producing a laser output having a $\geq 5$ $\mu$J pulse.

37. A method as claimed in claim 32, wherein acid etching includes heating said acid bath.

38. A method as claimed in claim 32, wherein said acid bath is an aqueous solution of about 15% HF.

39. A method as claimed in claim 32, wherein providing an oxide bulk glass body includes providing an oxide bulk glass body with a $\lambda$ transparency $\geq 90\%$/cm.

40. A method as claimed in claim 32, wherein providing said ultrashort pulse laser includes providing a $\lambda<1000$ nm laser.

41. A method as claimed in claim 32, wherein providing said laser includes providing a laser with a wavelength $\lambda$ in the range of $800\pm100$ nm.

42. A method as claimed in claim 32, wherein $\lambda$ is centered about 800 nm.

43. A method as claimed in claim 32, wherein providing an oxide bulk glass body includes providing a $TiO_2$ containing silica glass body.

44. A method as claimed in claim 43, wherein said $TiO_2$ containing silica glass body contains from 5 to 10 Wt. % $TiO_2$.

45. A method as claimed in claim 32, wherein providing an oxide bulk glass body includes providing a silica glass with at least 100 ppm wt. OH.

46. A method as claimed in claim 32, wherein providing an oxide bulk glass body includes providing a silica glass with at least 500 ppm wt. OH.

47. A method as claimed in claim 32, wherein providing an oxide bulk glass body includes providing an uncerammed glass-ceramic precursor glass.

48. A method as claimed in claim 47, wherein providing an uncerammed glass-ceramic precursor glass includes providing an aluminosilicate glass green body.

49. A method as claimed in claim 47, wherein providing an uncerammed glass-ceramic precursor glass includes providing an a lithium aluminosilicate glass.

50. A method as claimed in claim 47, wherein providing an uncerammed glass-ceramic precursor glass comprises providing a photosensitive nucleated glass.

51. A method as claimed in claim 50, wherein said photosensitive nucleated glass forms lithium metasilicate microcrystalline phases.

52. A method as claimed in claim 47, wherein providing an uncerammed glass-ceramic precursor glass comprises providing a glass which is cerammable into a negative thermal expansion glass-ceramic body.

53. A method as claimed in claim 32, wherein providing an oxide bulk glass body includes providing a batch melted glass.

54. A method as claimed in claim 32, wherein said hole precursor track pattern through said oxide glass body comprises an outline shell hole precursor track which surrounds a center glass volume which is detached from said oxide glass body with said acid etching to provide said optical fiber receiving hole.

55. A method as claimed in claim 54 wherein said outline shell hole precursor track has a circular cross section.

56. A method as claimed in claim 54 wherein said outline shell hole precursor track has a non-circular cross section.

57. A method as claimed in claim 54 wherein said outline shell hole precursor track has a varying cross-section.

58. A method as claimed in claim 54 wherein said provided oxide bulk glass body has a first surface and a second distal surface and a thickness middle between said first and second surfaces, and said outline shell hole precursor track has an expanding cross-section with said expanding cross-section expanding from a minimum cross-section proximate at least one of said surfaces to a maximum cross-section proximate said thickness middle.

59. An optical fiber device, said optical fiber device comprised of an optical fiber holder made by the method of claim 32.

60. A method as claimed in claim 54 wherein said glass body has a thickness middle with said outline shell hole precursor swelled at said thickness middle.

61. A method of making a plurality of precision holes through a bulk oxide glass body, said method comprising:
providing an ultrashort pulse laser for producing a laser output with a wavelength $\lambda$, said laser output having a subpicosecond laser pulse duration,
providing a laser output focussing lens for focussing said laser output, said lens having an air working distance $\geq 3$ mm and $\leq 0.5$ NA numerical aperture,
providing a oxide bulk glass receiving stage, said stage for receiving an oxide bulk glass body,
providing an oxide bulk glass body with a bulk thickness of at least 0.25 mm, said oxide bulk glass body having a transparency to $\lambda$,
positioning said oxide bulk glass body with said stage wherein said glass body is received by said stage,
focussing said laser output through said laser output focussing lens to produce a subpicosecond laser pulse duration focus proximate said oxide bulk glass body,
tracing a hole precursor track pattern through the at least 0.25 mm bulk thickness of said oxide bulk glass body with said subpicosecond laser pulse duration focus,
acid etching said oxide bulk glass body in an ultrasonic HF acid bath wherein said laser focus traced hole precursor track pattern is etched into a precise hole through the at least 0.25 mm glass bulk thickness,
rinsing and drying said acid etched oxide bulk glass body to provide a precise hole through the at least 0.25 mm glass bulk thickness of said oxide bulk glass body.

62. A method as claimed in claim 60, wherein providing said ultrashort pulse laser includes providing a <100 fs pulse laser for producing a laser output having a <100 fs laser pulse duration.

63. A method as claimed in claim 60, wherein providing said ultrashort pulse laser includes providing a <50 fs pulse laser for producing a laser output having a <50 fs laser pulse duration.

64. A method as claimed in claim 60, wherein providing said ultrashort pulse laser includes providing a <40 fs pulse laser for producing a laser output having a <40 fs laser pulse duration.

65. A method as claimed in claim 60, wherein providing said ultrashort pulse laser includes providing a $\geq 5$ $\mu$J pulse energy laser for producing a laser output having a $\geq 5$ $\mu$J pulse.

66. A method as claimed in claim 60, wherein acid etching includes heating said acid bath.

67. A method as claimed in claim 60, wherein said acid bath is an aqueous solution of about 15% HF.

68. A method as claimed in claim 60, wherein providing an oxide bulk glass body includes providing an oxide bulk glass body with a $\lambda$ transparency $\geq 90\%$/cm.

69. A method as claimed in claim 60, wherein providing said ultrashort pulse laser includes providing a $\lambda<1000$ nm laser.

70. A method as claimed in claim 60, wherein providing said laser includes providing a laser with a wavelength $\lambda$ in the range of 800±100 nm.

71. A method as claimed in claim 60, wherein $\lambda$ is centered about 800 nm.

72. A method as claimed in claim 60, wherein providing an oxide bulk glass body includes providing a $TiO_2$ containing silica glass body.

73. A method as claimed in claim 72, wherein said $TiO_2$ containing silica glass body contains from 5 to 10 Wt. % $TiO_2$.

74. A method as claimed in claim 60, wherein providing an oxide bulk glass body includes providing a silica glass with at least 100 ppm wt. OH.

75. A method as claimed in claim 60, wherein providing an oxide bulk glass body includes providing a silica glass with at least 500 ppm wt. OH.

76. A method as claimed in claim 60, wherein providing an oxide bulk glass body includes providing an uncerammed glass-ceramic precursor glass.

77. A method as claimed in claim 76, wherein providing an uncerammed glass-ceramic precursor glass includes providing an aluminosilicate glass green body.

78. A method as claimed in claim 77, wherein providing an uncerammed glass-ceramic precursor glass includes providing an a lithium aluminosilicate glass.

79. A method as claimed in claim 77, wherein providing an uncerammed glass-ceramic precursor glass comprises providing a photosensitive nucleated glass.

80. A method as claimed in claim 79, wherein said photosensitive nucleated glass forms lithium metasilicate microcrystalline phases.

81. A method as claimed in claim 78, wherein providing an uncerammed glass-ceramic precursor glass comprises providing a glass which is cerammable into a negative thermal expansion glass-ceramic body.

82. A method as claimed in claim 60, wherein providing an oxide bulk glass body includes providing a batch melted glass.

83. A method as claimed in claim 60, wherein said hole precursor track pattern through said oxide glass body comprises an outline shell hole precursor track which surrounds a center glass volume which is detached from said oxide glass body with said acid etching to provide said precise hole through said glass body.

84. A method as claimed in claim 83 wherein said outline shell hole precursor track has a circular cross section.

85. A method as claimed in claim 83 wherein said outline shell hole precursor track has a non-circular cross section.

86. A method as claimed in claim 83 wherein said outline shell hole precursor track has a varying cross-section.

87. A method as claimed in claim 83 wherein said provided oxide bulk glass body has a first surface and a second distal surface and a thickness middle between said first and second surfaces, and said outline shell hole precursor track has an expanding cross-section with said expanding cross-section expanding from a minimum cross-section proximate at least one of said surfaces to a maximum cross-section proximate said thickness middle.

88. An optical fiber device comprised of a bulk oxide glass body with at least one precision hole made by the method of claim 60.

89. A method as claimed in claim 83 wherein said outline shell hole precursor track has a first end and a distal second end, and said outline shell hole precursor track is swelled between said first end and said second end.

90. A bulk oxide glass precision hole precursor preform body, said hole precursor preform body comprising a bulk oxide glass body containing at least one laser traced outline shell hole precursor track pattern, said laser traced outline shell hole precursor track pattern traversing through said bulk oxide glass body with a swelled middle.

91. A bulk oxide glass precision hole precursor preform body, said hole precursor preform body comprising a bulk oxide glass body having a first surface and a second distal surface and a thickness middle between said first and second surfaces and containing at least one laser traced outline shell hole precursor track pattern which has an expanding cross-section with said expanding cross-section expanding from a minimum cross-section proximate at least one of said surfaces to a maximum cross-section proximate said thickness middle.

92. A precision hole precursor preform body as claimed in claim 91, wherein said laser traced outline shell hole precursor track pattern includes a funnel tapered section proximate said first surface and said minimum cross-section proximate said second distal surface.

93. A precision hole precursor preform body as claimed in claim 91, wherein said maximum cross-section is at least 30% greater than said minimum cross-section.

94. A precision hole precursor preform body as claimed in claim 91, said preform body having a bulk glass thickness of at least 0.25 mm between said first surface and said second distal surface.

95. A precision hole precursor preform body as claimed in claim 91 wherein said laser traced outline shell hole precursor track pattern is acid etchable into a precise hole.

96. A precision hole precursor preform body as claimed in claim 91 wherein said laser traced outline shell hole precursor track pattern expanding cross-section has a circular geometry.

97. A precision hole precursor preform body as claimed in claim 91 wherein said laser traced outline shell hole precursor track pattern expanding cross-section has an oval geometry.

98. A precision hole precursor preform body as claimed in claim 91 wherein said laser traced outline shell hole precursor track pattern expanding cross-section has a straight side geometry.

99. A precision hole precursor preform body as claimed in claim 91 wherein said bulk oxide glass body is comprised of a $TiO_2$ containing silica glass.

100. A precision hole precursor preform body as claimed in claim 91 wherein said bulk oxide glass body is comprised of a silica glass with <99 wt. % $SiO_2$.

101. A precision hole precursor preform body as claimed in claim 91 wherein said bulk oxide glass body is comprised of a silica glass with at least 100 ppm wt. OH.

102. A precision hole precursor preform body as claimed in claim 91 wherein said bulk oxide glass body is comprised of a glass-ceramic glass.

103. A precision hole precursor preform body as claimed in claim 91 wherein said bulk oxide glass body is comprised of an aluminosilicate glass green body.

104. A precision hole precursor preform body as claimed in claim 91 wherein said bulk oxide glass body is comprised of a lithium aluminosilicate green glass.

105. A precision hole precursor preform body as claimed in claim 91 wherein said bulk oxide glass body is comprised of a batch melted silica glass.

* * * * *